US009567469B2

(12) United States Patent
Haines

(10) Patent No.: US 9,567,469 B2
(45) Date of Patent: Feb. 14, 2017

(54) SURFACE COATINGS AND METHODS

(71) Applicant: Textured Coatings of America, Inc., Panama City, FL (US)

(72) Inventor: Jay A. Haines, Panama City, FL (US)

(73) Assignee: Textured Coatings of America, Inc., Panama City, FL (US)

( * ) Notice: Subject to any disclaimer, the term of this patent is extended or adjusted under 35 U.S.C. 154(b) by 551 days.

(21) Appl. No.: 13/927,012

(22) Filed: Jun. 25, 2013

(65) Prior Publication Data

US 2013/0288042 A1 Oct. 31, 2013

Related U.S. Application Data

(63) Continuation-in-part of application No. 13/744,208, filed on Jan. 17, 2013, and a continuation-in-part of application No. PCT/US2012/071439, filed on Dec. 21, 2012, and a continuation-in-part of application No. 13/481,499, filed on May 25, 2012, now Pat. No. 8,808,838, said application No. PCT/US2012/071439 is a continuation of application No. 13/340,542, filed on Dec. 29, 2011, now abandoned, and a continuation of application No. 13/481,499, filed on May 25, 2012, now Pat. No. 8,808,838, said application No. 13/744,208 is a continuation of application No. PCT/US2012/071439, filed on Dec. 21, 2012, which is a continuation of application No. 13/481,499, filed on May 25, 2012.

(60) Provisional application No. 61/636,472, filed on Apr. 20, 2012, provisional application No. 61/580,128, filed on Dec. 23, 2011.

(51) Int. Cl.
C09D 5/33 (2006.01)
B05D 1/02 (2006.01)
B05D 3/02 (2006.01)
E04D 1/16 (2006.01)
C09D 7/12 (2006.01)
C08K 3/22 (2006.01)

(52) U.S. Cl.
CPC ............... C09D 5/004 (2013.01); B05D 1/02 (2013.01); B05D 3/0254 (2013.01); C09D 7/1216 (2013.01); E04D 1/16 (2013.01); C08K 3/22 (2013.01); Y02B 80/34 (2013.01); Y10T 428/263 (2015.01); Y10T 428/269 (2015.01); Y10T 428/3154 (2015.04)

(58) Field of Classification Search
USPC .............................. 427/421.1, 160; 524/430
See application file for complete search history.

(56) References Cited

U.S. PATENT DOCUMENTS

| 4,916,014 A | 4/1990 | Weber et al. |
| 5,215,805 A | 6/1993 | Pavia, Jr. |
| 5,665,793 A | 9/1997 | Anders |
| 6,004,894 A | 12/1999 | Faust et al. |
| 6,174,360 B1 | 1/2001 | Sliwinski et al. |
| 6,454,848 B2 | 9/2002 | Sliwinski et al. |
| 6,468,647 B1 | 10/2002 | Sutter et al. |
| 6,616,744 B1 | 9/2003 | Sainz et al. |
| 7,157,112 B2 | 1/2007 | Haines |
| 2003/0158327 A1 | 8/2003 | Han et al. |
| 2005/0145134 A1 | 7/2005 | Petrin et al. |
| 2005/0215685 A1* | 9/2005 | Haines ..................... 524/430 |
| 2005/0255284 A1* | 11/2005 | Pritchett .................... 428/74 |
| 2005/0260414 A1 | 11/2005 | MacQueen |
| 2008/0086970 A1 | 4/2008 | Teng et al. |
| 2008/0152813 A1* | 6/2008 | Bowe et al. ............... 427/340 |
| 2009/0029176 A1* | 1/2009 | Nishida et al. ........... 428/421 |
| 2009/0139181 A1* | 6/2009 | Bowe et al. ............. 52/741.3 |
| 2009/0197990 A1 | 8/2009 | Bohler et al. |
| 2009/0214814 A1 | 8/2009 | Rintoul et al. |
| 2010/0233461 A1 | 9/2010 | Wood et al. |
| 2011/0008622 A1 | 1/2011 | Kalkanoglu et al. |
| 2011/0027533 A1 | 2/2011 | Kennedy et al. |
| 2011/0104422 A1 | 5/2011 | Kalkanoglu et al. |

FOREIGN PATENT DOCUMENTS

WO WO-2010/002934 A2 1/2010

OTHER PUBLICATIONS

U.S. Appl. No. 61/580,128, filed Dec. 23, 2011, Jay A. Haines.
First Action Interview Office Action dated Jul. 1, 2013 in related U.S. Appl. No. 13/744,208.
International Search Report dated Jan. 25, 2013 in related Int'l PCT Application No. PCT/US12/71439.
US Office Action dated Feb. 26, 2013 in related U.S. Appl. No. 13/481,499.
US Office Action dated Aug. 24, 2012 in related U.S. Appl. No. 13/481,499.

(Continued)

Primary Examiner — Nathan T Leong
(74) Attorney, Agent, or Firm — Wilson Elser Moskowitz Edelman & Dicker LLP

(57) ABSTRACT

Provided herein include methods and compositions pertaining to coatings, such as paints, for covering a substrate. In some aspects and embodiments the coatings may include a heat reflective metal oxide pigment that, applied to an external surface of a building (or is applied on a substrate used for an external surface of a building such as an architectural metal panel, EIFS, as a stucco top coat or as a top coat for roofing tiles) reduces the energy consumption in the building. In other aspects and embodiments, provided are textured coatings having a texturing material; for example, methods and compositions are provided pertaining to textured coatings that can be applied robotically or in an automated fashion. In various aspects and embodiments, textured coatings are provided that include a texturing material and a heat reflective metal oxide pigment. In some aspects and embodiments heat reflective coatings for concrete or clay tiles and methods of applying such are provided.

10 Claims, No Drawings

(56) References Cited

OTHER PUBLICATIONS

US Office Action dated Jul. 30, 2013 in related U.S. Appl. No. 13/481,499.
Kaymax, KYNAR® Modified Fluoropolymer Roof Coating, Technical Data, Apr. 2012, 2 pages.
Kaymax, Quest Construction Products, A Quest Specialty Chemicals Company, Product Quick Finder, 2013, 5 pages.
Dupont® Marine Finishes, Imron® MS600™ Polyurethane Topcoat, 2008, 3 pages.
Kynac Aquatec®, Water-based PVDF Field Application Case Study, "High-performance roof coating provides long-lasting protection in extreme weather conditions." 2012, 2 pages.
Rust-Oleum Brands, Product Information, "Marine Coatings Topside Paint." Revised 20/07, 1 page.
Arkema, KENAR 500, PVDF Resin-Based Metal Coatings, 2008, 14 pages.
Ultra-Cool™, The new heat reflective coatings from BASF, 6 pages.
US Office Action dated Dec. 26, 2013 in related U.S. Appl. No. 13/481,499.
US Office Action dated Feb. 11, 2014 in related U.S. Appl. No. 13/744,208.

\* cited by examiner

SURFACE COATINGS AND METHODS

CROSS-REFERENCE TO RELATED PATENT APPLICATIONS

The application is a continuation-in-part of International PCT Patent Application No. PCT/US2012/071439 filed Dec. 21, 2012, U.S. patent application Ser. No. 13/744,208 filed Jan. 17, 2013 and U.S. patent application Ser. No. 13/481,499, filed May 25, 2012, all of which claim priority to U.S. Provisional Patent Application Ser. Nos. 61/580,128, filed Dec. 23, 2011 and 61/636,472, filed Apr. 20, 2012.

FIELD OF THE INVENTION

The present disclosure relates generally to the field of coatings, such as paints, for covering a substrate. In certain aspects and embodiments, the inventions disclosed herein may also pertain generally to methods and compositions for promoting energy conservation.

BACKGROUND OF THE INVENTION

The information provided herein and references cited are provided solely to assist the understanding of the reader, and does not constitute an admission that any of the references or information is prior art to the present invention.

U.S. Pat. No. 4,916,014 discloses infrared reflecting compositions for coating of structures exposed to sunlight which reduce heating of the structure by the sun. Infrared reflecting materials described include metals, such as noble metals, zinc, nickel, copper, or aluminum.

U.S. Pat. No. 6,004,894 discloses porcelain enamel compositions for use in forming infrared reflective coatings comprising a glass component and a cerium oxide component.

U.S. Pat. Nos. 6,174,360 and 6,454,848 (the disclosures of which are incorporated herein by reference) disclose building materials, such as stucco, roofing tiles, roofing granules, roofing shingles, or brick, comprising infrared reflective pigments having a corundum-hematite crystalline structure.

U.S. Pat. No. 6,468,647 discloses infrared reflect visually colored metal substrates or metal-coated particles prepared by burnishing colored pigments into the metal.

U.S. Pat. No. 7,157,112 discloses "methods for reducing energy consumption of a building by coating one or more external walls with a heat reflective wall paint."

SUMMARY OF THE INVENTION

The present disclosure relates to methods and compositions pertaining to coatings, such as paints, for covering a substrate. In various aspects and embodiments the coatings may include a heat reflective metal oxide pigment that, when applied to an external surface of a building helps to reduce the energy consumption in the building. In certain aspects and embodiments the disclosed methods and compositions pertain to heat reflective coatings for metal panels that may be used, for example, for exterior surfaces of structures such as buildings, vehicles (including cars, boats, ships, motor homes, busses, trucks, airplanes, etc.). Application of such coating compositions to exterior vertical surfaces (such as walls) of a structure such as a building, etc., provide for lower absorption of solar energy through the coated wall. This, in turn, results in lower wall surface temperatures and lower heat transfer through the coated walls. Thus, the interior temperature of the structure, such as a building, etc., is cooler and consequently, less energy is consumed to cool the interior of said structure. Vertical walls coated with the present heat reflective wall paints can be effective in lowering cooling energy requirements. In some embodiments, coated exterior surfaces such as provided herein with no or sparse amounts of insulation may exhibit greater reductions in cooling energy requirements that with insulation alone.

Some of the aspects and embodiments described herein are based at least in part on three surprising findings regarding the use of a thick coating (greater than about 5, 10, 12, 15 etc., mils dry film thickness) rather than the prior thin (about 4 mils or less dry film thickness coating). These include: (a) a thick coating having heat reflective metal pigments can be applied to a surface, including a metal panel, EIFS or as a stucco top coat, and still exhibit similar heat reflective properties without a white undercoat (thus obviating a need for a white undercoat or primer); (b) the thick coating can use a relatively lower concentration of heat reflective pigment, thus resulting in coatings that are surprisingly cost effective and commercially feasible; and (c) texturing agents and heat reflective pigments can be included in a single thick coat instead of requiring a two-coat system with a textured bottom coat and a thin heat reflective coating on top.

Certain various aspects and embodiments disclosed herein are based at least in part on findings that the coatings described herein are surprisingly effective when applied to metal substrates (such as metal panels), such as for example metal panels used architecturally for external walls or roofs as described herein. In this regard, it has been found that coatings having heat reflective pigments applied on metal panels are surprisingly effective in reflecting heat and insulating heat; textured coatings are surprisingly effective in creating desired looks and textures when applied on metal panels; and thick coatings (with and without texturing) are surprisingly effective with regard to the three findings described above.

Some of the aspects and embodiments of compositions and methods described herein are based at least in part on the surprising finding that the heat reflective coatings can reduce interior temperatures and cooling energy amounts and costs when applied to relatively well insulated substrates (such as EIFS) even more than similarly insulated substrates having a non-heat reflective coating. As such certain aspects and embodiments disclosed herein are based at least in part on findings that the coatings described herein are surprisingly effective in further insulating a building when applied to EIFS used in the construction of a building. Moreover, thick coatings (with or without texturing) when applied to EIFS were surprisingly effective with regard to the three findings described above for metal substrates. Moreover, the coatings disclosed herein (including textured coatings) have been found to be surprisingly effective in creating desired looks and textures when applied (either by spraying or by trowel) to EIFS.

Certain various aspects and embodiments disclosed herein are based at least in part on findings that the coatings described herein are surprisingly effective when applied as a stucco topcoat. In this regard, it was found that coatings having heat reflective pigments applied as a stucco topcoat are surprisingly effective in reflecting heat and insulating heat; textured coatings are surprisingly effective in creating desired looks and textures when applied as a stucco topcoat; and thick coatings (with and without texturing) when applied as a stucco topcoat are surprisingly effective with regard to the three findings described above. Also, certain of the aspects and embodiments are based on the surprising finding that certain textured coatings such as described herein (with or without heat reflective pigments) can be effectively applied as a stucco topcoat by spraying.

In some aspects and embodiments, coatings as described herein that include heat reflective pigments (with or without texturing agents) have an additional advantage of color fade resistance when applied to a substrate (including when applied as a relatively thick coating such as greater than about 5, 10, 12, 15 etc., mils dry film thickness) such as a metal substrate (e.g., metal panel), EIFS or as a stucco topcoat.

In some aspects and embodiments, coatings as described herein when applied to materials that people touch (such as railings, benches, doors, handles, and the like), the surface temperature of the materials is lessened. In certain embodiments, this advantage may be particularly noticeable in the case of metal materials in areas exposed to direct sun.

Certain aspects and embodiments are based on the surprising finding that when textured coatings are prepared having a certain type (e.g., non-abrasive), size and amount of texturing materials as described herein, the textured coatings can be applied by spraying, including in certain embodiments using an automated sprayer. Moreover, it was also surprisingly found that sprayers could be used to effectively apply a stucco-type coating as described herein, for example a stucco topcoat (such spray application can be performed on site for example in the case of stucco topcoats applied to building walls or in a factory for applications such as metal panels or EIFS materials if desired). Accordingly, provided herein include methods and compositions for applying textured coatings, such as coatings that have a concrete appearance or a stucco appearance, using a sprayer to a metal panel, EIFS or as a stucco topcoat. Such methods and compositions for spray application may include non abrasive texturing materials such as perlite or pumice in the amounts and sizes such as described herein. Also provided are light-weight stucco topcoat coatings (with and without heat reflective pigments) that include perlite and/or pumice texturing materials that may be applied with a trowel or by spraying. It was also found that coatings that include non-abrasive texturing materials such as, for example, perlite and/or pumice (such as when spray applied and/or for example applied as a stucco top coat) are surprisingly advantageous with regard to the pinholes in the final product.

Some aspects and embodiments are based on the surprising finding that non-abrasive texturing materials (such as pumice and/or perlite) having particles of certain sizes can be used to make textured coatings (for example coatings that can be used on metal panels, EIFS, and/or as a stucco top coat) that mimic the hardness and texture of traditional stucco top coats that include abrasive texturing materials. Such non-abrasive textured coatings with such specified particle sizes in certain embodiments have advantages over coatings with abrasive texturing materials, for example for spray application and/or automated spray application and in certain embodiments may have advantages in being more light weight than coatings having abrasive texturing materials. Although such non-abrasive textured coatings with such specified particle sizes can have advantages in spray application, in some embodiments the coatings can also be applied using non-spray methods such as by trowel or brush or the like. In some embodiments a sprayable hard non-abrasive textured coating as disclosed herein includes abrasive texturing materials (such as, for example, silica, silica sand, quartz, calcium carbonate, granite, marble, or limestone) in an amount that is less than 10% by wet weight; or less than 8% by wet weight; or less than 6% by wet weight; or less than 5% by wet weight; or less than 4% by wet weight; or less than 3% by wet weight; or less than 2% by wet weight; or less than 1% by wet weight; or less than 0.5% by wet weight. In some embodiments a sprayable hard non-abrasive textured coating as disclosed herein does not include abrasive texturing materials (such as, for example, silica, silica sand, quartz, calcium carbonate, granite, marble, or limestone). In some embodiments such sprayable hard non-abrasive textured coatings are achieved using pumice as a texturing material, for example pumice having a particle size of at least about 150 microns. Accordingly in certain embodiments provided is a textured coating (with or without heat reflective metal oxide pigments) that includes at least about 7% by wet weight pumice texturing materials having particle sizes of at least about 150 microns; or at least about 175 microns, or at least about 200 microns; or at least about 250 microns; or at least about 300 microns; or at least about 350 microns or at least about 400 microns; or at least about 500 microns; or at least about 600 microns; or at least about 800 microns. In one embodiment, provided is a textured coating (with or without heat reflective metal oxide pigments) that includes at least about 8% by wet weight pumice texturing materials having particle sizes of at least about 150 microns; or at least about 175 microns, or at least about 200 microns; or at least about 250 microns; or at least about 300 microns; or at least about 350 microns or at least about 400 microns; or at least about 500 microns; or at least about 600 microns; or at least about 800 microns. In one embodiment, provided is a textured coating (with or without heat reflective metal oxide pigments) that includes at least about 9% by wet weight pumice texturing materials having particle sizes of at least about 150 microns; or at least about 175 microns, or at least about 200 microns; or at least about 250 microns; or at least about 300 microns; or at least about 350 microns or at least about 400 microns; or at least about 500 microns; or at least about 600 microns; or at least about 800 microns. In one embodiment, provided is a textured coating (with or without heat reflective metal oxide pigments) that includes at least about 10% by wet weight pumice texturing materials having particle sizes of at least about 150 microns; or at least about 175 microns, or at least about 200 microns; or at least about 250 microns; or at least about 300 microns; or at least about 350 microns or at least about 400 microns; or at least about 500 microns; or at least about 600 microns; or at least about 800 microns. In one embodiment, provided is a textured coating (with or without heat reflective metal oxide pigments) that includes at least about 11% by wet weight pumice texturing materials having particle sizes of at least about 150 microns; or at least about 175 microns, or at least about 200 microns; or at least about 250 microns; or at least about 300 microns; or at least about 350 microns or at least about 400 microns; or at least about 500 microns; or at least about 600 microns; or at least about 800 microns. In one embodiment, provided is a textured coating (with or without heat reflective metal oxide pigments) that includes at least about 12% by wet weight pumice texturing materials having particle sizes of at least about 150 microns; or at least about 175 microns, or at least about 200 microns; or at least about 250 microns; or at least about 300 microns; or at least about 350 microns or at least about 400 microns; or at least about 500 microns; or at least about 600 microns; or at least about 800 microns. In one embodiment, provided is a textured coating (with or without heat reflective metal oxide pigments) that includes at least about 13% by wet weight pumice texturing materials having particle sizes of at least about 150 microns; or at least about 175 microns, or at least about 200 microns; or at least about 250 microns; or at least about 300 microns; or at least about 350 microns or at least about 400 microns; or at least about 500 microns; or at least about 600 microns; or at least about 800 microns. In one embodiment, provided is a textured coating (with or without heat reflective metal oxide pigments) that includes at least about 14% by wet weight pumice texturing materials having particle sizes of at least about 150 microns; or at least about 175 microns, or at least about 200 microns; or at least about 250 microns; or at least about 300 microns; or at least about 350 microns or at least about 400 microns; or at least about 500 microns; or at least about 600 microns; or at least about 800 microns. In some embodiments, provided is a textured coating (with or without heat reflective metal oxide pigments) that includes at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight pumice particles having particle sizes between about 150-1700 microns. In some embodiments, provided is a textured coating (with or without heat reflective metal oxide pigments) that includes at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight pumice particles having particle sizes between about 150-900 microns. In some embodiments, provided is a textured coating (with or without heat reflective metal oxide pigments) that includes at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight pumice particles having particle sizes between about 150-800 microns. In some embodiments, provided is a textured coating (with or without heat reflective metal oxide pigments) that includes at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight pumice particles having particle sizes between about 175-700 microns. In some embodiments, provided is a textured coating (with or without heat reflective metal oxide pigments) that includes at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight pumice particles having particle sizes between about 150-600 microns. In some embodiments provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating) wherein at least about 30% of the pumice particles are larger than 595 microns. In some embodiments provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating) wherein at least about 30% of the pumice particles are larger than 420 microns. In some embodiments provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating) wherein the pumice particles are between about 175-700 microns. In some embodiments provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating) wherein the pumice particles are between about 150 and 595 microns. In some embodiments provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating) wherein the pumice particles are between about 150-1680 microns. In some embodiments provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating) wherein about 50-80% of the pumice particles are between about 420-700 microns. In some embodiments provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating) wherein about 50-80% of the pumice particles are between about 420-700 microns. In some embodiments provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating) wherein about 75-90% of the pumice particles are between about 300-600 microns. In some embodiments, provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating), wherein the pumice particles are between about 150-595 microns, with about 60±10% of the particles less than about 420 microns, about 16±10% of the particles less than about 300 microns, 4±1% of the particles less than about 250 microns, and 0.7±0.5% less than about 175 microns. In some embodiments, provided is a textured coating (with or without heat reflective metal oxide pigments) that includes a mixture of pumice particles (for example in an amount that is at least about 7%, or at least about 8%, or at least about 9%, or at least about 10%, or at least about 11%, or at least about 12%, or at least about 13%, or at least about 14%, or at least about 15%, or at least about 16%, or at least about 17%, or at least about 18%, or at least about 19%, or at least about 20% by wet weight of the coating), wherein the pumice particles are between about 175-700 microns, with about 55±10% of the particles less than about 595 microns, 30±10% of the particles less than about 420 microns, about 17±10% of the particles less than about 300 microns, 5±1% of the particles less than about 250 microns, and 5±0.5% less than about 175 microns. In some embodiments, provided is a hard non-abrasive textured coating (with or without heat reflective metal oxide pigments) that includes a mixture of pumice (for example in the amounts and particle sizes as disclosed herein) and perlite.

Accordingly, in one aspect, provided are compositions that include a substrate such as described herein (for example a metal substrate (e.g., metal panel), EIFS, or as a stucco topcoat) with a coating that includes a heat reflective metal oxide pigment on the surface, wherein the coating with the heat reflective metal oxide pigment is at least 12 mils dry film thickness; or at least about 13 mils dry film thickness; or at least about 14 mils dry film thickness; or at least about 15 mils dry film thickness; or at least about 16 mils dry film thickness; or at least about 17 mils dry film thickness; or at least about 18 mils dry film thickness; or at least about 19 mils dry film thickness; or at least about 20 mils dry film thickness; or at least about 25 mils dry film thickness; or at least about 30 mils dry film thickness. In a similar or related aspect, provided are methods of applying a coating having a heat reflective metal oxide pigment to the surface of a substrate such as described herein, wherein the coating is applied a thickness of at least 12 mils dry film thickness; or at least about 13 mils dry film thickness; or at least about 14 mils dry film thickness; or at least about 15 mils dry film thickness; or at least about 16 mils dry film thickness; or at least about 17 mils dry film thickness; or at least about 18 mils dry film thickness; or at least about 19 mils dry film thickness; or at least about 20 mils dry film thickness; or at least about 25 mils dry film thickness; or at least about 30 mils dry film thickness. In some embodiments of the compositions and methods of this aspect, the coating is about 12-20 mils dry film thickness; or about 13-16 mils dry film thickness; or about 15-20 mils dry film thickness; or about 16-20 mils dry film thickness; or about 10-35 mils dry film thickness; or about 10-12 mils dry film thickness; or about 10-15 mils dry film thickness; or about 20-35 mils dry film thickness; or about 25-35 mils dry film thickness; or about 30-35 mils dry film thickness; or about 12-35 mils dry film thickness; or about 15-35 dry mils thickness. In some embodiments of this aspect, the coating that includes a heat reflective metal oxide pigment is a textured coating, in other embodiments the coating is a smooth coating. In some embodiments, the substrate is a metal substrate (e.g., a metal panel including an architectural metal panel), EIFS, or as a stucco topcoat, for example for external walls. In some embodiments, the metal panel is a smooth skin metal panel. In some embodiments the heat reflective metal pigment is present at a concentration between about 0.1-12% by weight.

In some aspects, heat reflective metal oxide pigment coating systems (for example for metal substrates) as provided herein include a polyurethane (e.g., a one or two component polyurethane) coat or layer, and/or a fluorinated resin system (for example polyvinylidene fluoride (PVDF) or fluoroethylene-alkyl vinyl ether (FEVE)) containing coat or layer, or a layer that includes a polyurethane (e.g., a one or two component polyurethane) and a fluorinated resin system (for example, PVDF or FEVE). In some embodiments, the polyurethane system provides chemical resistance. In certain embodiments having a heat reflective metal oxide pigment system that includes a polyurethane coating or layer may be particularly advantageous for marine applications on boats, ships, structures that are intended to be in or around marine environments, such as docks and the like, especially (but not only) for marine applications and embodiments in which the substrate for the coating is metal. In some embodiments such heat reflective coating systems may include (1) a substrate (such as a metal substrate, for example a metal substrate for use in marine applications or environments), (2) an optional metal primer (can be a spot primer applied only to corroded areas), (3) an optional acrylic/latex resin such as "Tex-Bond" coating to cover any previously coated substrate, (4) a heat reflective coating as described herein that can optionally be a fluorinated resin system (for example PVDF or FEVE) containing layer, and (5) a polyurethane coating layer (e.g., a two component polyurethane coating layer)—in certain variations of these embodiments the heat reflective metal oxide pigment coating (4) is a acrylic coating or includes a resin system other than a fluorinated resin system. In other embodiments such heat reflective metal oxide pigment coating systems may include (1) a substrate (such as a metal substrate, for example a metal substrate for use in marine applications or environments), (2) an optional metal primer (can be a spot primer applied only to corroded areas), (3) an optional acrylic/latex resin such as "Tex-Bond" coating to cover any previously coated substrate, (4) a heat reflective metal oxide pigment coating as described herein that is a polyurethane coating layer (e.g., a two component polyurethane coating layer) that may optionally include a fluorinated resin system (for example PVDF or FEVE). Embodiments in which there is a polyurethane layer over the heat reflective metal oxide pigment layer as described herein may in certain situations, such as situations where the coatings may be exposed to more extensive wear and tear (for example outer surfaces of a working boat such as a tug boat that needs to be repainted on a short periodic schedule), have an additional advantage in that due to decreased color fading caused by the heat reflective metal oxide pigments updating a worn coating can be done by simply reapplying the outermost polyurethane layer without needed to reapply pigment coatings. In certain embodiments, a coating system having heat reflective metal oxide pigments and a polyurethane layer as described in this aspect may further include texturing materials as described herein. In some embodiments, a coating system having heat reflective metal oxide pigments and a polyurethane layer such as described in this aspect is a non-slip coating for walking areas, such as decks, dock surfaces, decks or walking areas of boats or ships, pool decks, sidewalks and the like. In some embodiments, such a heat reflective metal oxide pigment containing non-slip coating system may include (1) a walking surface substrate (such as a deck, etc.), (2) an optional primer or bonding layer (for example an acrylic/latex resin such as "Tex-Bond"), (3) a textured coating layer such as described herein, and (4) an optional polyurethane layer as described herein—in various embodiments the heat reflective metal oxide pigments may be present in any one (or more than one) of the (2)-(4) layers. In some embodiments of such heat reflective metal oxide pigment containing non-slip coating systems the coating system includes (1) a walking surface substrate (such as a deck, etc.), (2) an optional primer or bonding layer (for example an acrylic/latex resin such as "Tex-Bond"), (3) a primary layer (such as an acrylic layer, for example a layer of REFLECT-TEC™), (4) a texturing material sprinkled on the primary layer, (5) a secondary layer (such as an acrylic layer, for example a layer of REFLECT-TEC™) coated over the primary layer and the texturing material, and (6) an optional polyurethane top coat layer as described herein—in some aspects of this embodiment pigments to create the desired color may be present in either or both of the primary and secondary layers and heat reflective metal oxide pigments may be present in either or both of the primary and secondary layers. In some embodiments of such non-slip coatings, the texturing material may have relatively large particle sizes, for example the texturing material may include particles of at least about 200 microns; or at least about 300 microns; or at least about 500 microns; or at least about 1,000 microns; or at least about 1,500 microns; or at least about 2,000 microns. In some embodiments of such non-slip coatings the texturing material may include aluminum oxide.

In certain aspects, heat reflective metal oxide pigment coating systems (for any substrate, including for example concrete substrates such as concrete or clay tiles) as provided herein include heat reflective metal oxide pigment as well as an acrylic latex and/or a fluorinated resin system (for example polyvinylidene fluoride (PVDF) or fluoroethylene-alkyl vinyl ether (FEVE)). In some embodiments of a heat reflective coating as provided herein that includes an acrylic and/or a fluorinated resin system, the acrylic resin is a quick set resin as provided herein. In some embodiments, the acrylic latex makes up between 50-90%; or 60-80%; or 75-85%, or 65-75% by weight of the coating, and/or the fluorinated resin system makes up between 0-50%; or 5-40%; or 5-30%; or 5-25%; or 10-30%; or 15-25% by weight of the coating. In some embodiments, the coatings of this aspect do not include a fluorinated resin. In certain embodiments, a heat reflective coating that includes an acrylic and/or a fluorinated resin system as provided in this aspect, is applied as a topcoat to a substrate at a thickness of about 1-15 mils; or 1-12 mils; or 2-12 mils; or 2-10 mils; or 2-8 mils; or 2-6 mils; or 3-5 mils dry film thickness. In some embodiments, a heat reflective coating that includes an acrylic and/or a fluorinated resin system as provided in this aspect, is applied as a topcoat to a substrate at a in one or two or three or more coats, wherein each coat is applied to the substrate at a thickness of about 1-15 mils; or 1-12 mils; or 2-12 mils; or 2-10 mils; or 2-8 mils; or 2-6 mils; or 2-5 mils, or 3-6 mils; or 3-7 mils wet film thickness. In certain embodiments, a heat reflective coating that includes an acrylic and/or a fluorinated resin system as provided in this aspect, is applied as a topcoat to a substrate at a thickness of about 1-15 mils; or 1-12 mils; or 2-12 mils; or 2-10 mils; or 2-8 mils; or 2-6 mils; or 3-5 mils dry film thickness. In some embodiments, a heat reflective coating that includes an acrylic and/or a fluorinated resin system as provided in this aspect, is applied as a topcoat to a substrate at a in two coats, wherein each coat is applied to the substrate at a thickness of about 1-15 mils; or 1-12 mils; or 2-12 mils; or 2-10 mils; or 2-8 mils; or 2-6 mils; or 2-5 mils, or 3-6 mils; or 3-7 mils wet film thickness. In certain embodiments of this aspect, the coating is a clear coating having little or no coloring pigments other than the heat reflective metal oxide pigments.

In some aspects provided is a concrete or clay substrate (such as, for example a concrete or clay tile, including a concrete or clay roofing tile) having a heat reflective metal oxide pigment coating system as described herein on its surface as well as methods of applying a heat reflective metal oxide pigment coating system as described herein to such concrete or clay substrates. In certain embodiments of this aspect, the heat reflective metal oxide pigment coating systems as provided herein, that is applied to a concrete or clay substrate includes a heat reflective metal oxide pigment as well as an acrylic latex and/or a fluorinated resin system (for example polyvinylidene fluoride (PVDF) or fluoroethylene-alkyl vinyl ether (FEVE)). In some embodiments of this aspect, the acrylic resin is a quick set resin as provided herein. In some embodiments of this aspect, the acrylic latex of the coating makes up between 50-90%; or 60-80%; or 75-85%, or 65-75% by weight of the coating, and/or the fluorinated resin system makes up between 0-50%; or 5-40%; or 5-30%; or 5-25%; or 10-30%; or 15-25% by weight of the coating. In some embodiments, the coatings of this aspect do not include a fluorinated resin. In certain embodiments of this aspect, the heat reflective coating that includes an acrylic and/or a fluorinated resin system as provided in this aspect is applied as a topcoat to the concrete or clay substrate at a thickness of about 1-15 mils; or 1-12 mils; or 2-12 mils; or 2-10 mils; or 2-8 mils; or 2-6 mils; or 3-5 mils dry film thickness. In some embodiments of this aspect, a heat reflective coating that includes an acrylic and/or a fluorinated resin system is applied as a topcoat to a concrete or clay substrate in one or two or three or more coats, wherein each coat is applied to the substrate at a thickness of about 1-15 mils; or 1-12 mils; or 2-12 mils; or 2-10 mils; or 2-8 mils; or 2-6 mils; or 2-5 mils, or 3-6 mils; or 3-7 mils wet film thickness. In certain embodiments of this aspect, a heat reflective coating that includes an acrylic and/or a fluorinated resin system is applied as a topcoat to a concrete or clay substrate at a thickness of about 1-15 mils; or 1-12 mils; or 2-12 mils; or 2-10 mils; or 2-8 mils; or 2-6 mils; or 3-5 mils dry film thickness. In some embodiments of this aspect, a heat reflective coating that includes an acrylic and/or a fluorinated resin system is applied as a topcoat to a concrete or clay substrate at a in two coats, wherein each coat is applied to the substrate at a thickness of about 1-15 mils; or 1-12 mils; or 2-12 mils; or 2-10 mils; or 2-8 mils; or 2-6 mils; or 2-5 mils, or 3-6 mils; or 3-7 mils wet film thickness. In certain embodiments of this aspect, the coating is a clear coating having little or no coloring pigments other than the heat reflective metal oxide pigments. In certain embodiments, the heat reflective coating is applied after the tiles have been cured (hardened). In some embodiments, the heat reflective coating is applied to the concrete or clay tiles immediately after the tiles are removed from a heating element causing the tiles to cure (harden) and the tiles are still hot; for example the heat reflective coating may be applied within 1 second; or 2 seconds; or 3 seconds; or 4 seconds; or 5 seconds; or 10 seconds; or 15 seconds; or 30 seconds; or one minute following the tile being removed from the heating element and/or while the tile is still hot such as above 80 degrees; or above 85 degrees; or above 90 degrees; or above 100 degrees; or above 105 degrees; or above 110 degrees; or above 115 degrees; or above 120 degrees Fahrenheit. In certain embodiments of this aspect, the heat eat reflective metal oxide pigment coating system is applied to the concrete or clay substrate (such as, for example a concrete or clay tile, including a concrete or clay roofing tile) while the concrete or clay substrate is still wet. In some embodiments, a coat of the heat reflective metal oxide pigment coating system is applied to the concrete or clay substrate (such as, for example a concrete or clay tile, including a concrete or clay roofing tile) while the concrete or clay substrate is still wet, and the concrete or clay substrate with the coating is heated/baked such that the concrete or clay substrate and the coating both dry/harden. In some embodiments, a first coat of the heat reflective metal oxide pigment coating system is applied to the concrete or clay substrate (such as, for example a concrete or clay tile, including a concrete or clay roofing tile) while the concrete or clay substrate is still wet, and the concrete or clay substrate with the coating is heated/baked such that the concrete or clay substrate and the coating both dry/harden; and a second coat of the heat reflective metal oxide pigment coating system is subsequently applied, optionally the concrete or clay substrate is heated again to dry/harden/cure the second coat. The heating of the concrete or clay tiles to cure/harden the tiles and/or cure the heat reflective coatings as described herein may be performed using heating elements and methods commonly known in the art. For example an infrared heating element may be used. In certain embodiments, the humidity is controlled during one or more heating/baking steps of this aspect, for example, the heating/baking may occur in a low humidity environment. In some embodiment, the heating/baking occurs with a forced air system such as by using fans. In some embodiments a heating element for drying/curing/hardening the concrete or clay tiles and/or drying a heat reflective coating as described herein heats the tiles to about 90-120 degrees, or about 80-150 degrees, or about 85-125 degrees; or about or about 85-95 degrees, or about 90-100 degrees, or about 95-105 degrees, or about 100-110 degrees, or about 110-120 degrees, or about 115-125 degrees Fahrenheit. In certain embodiments of this aspect the heat reflective coatings are spray applied in a factory setting. In certain embodiments of this aspect, the concrete or clay substrate is a concrete or clay tile (such as a roofing tile) and the coatings are applied in an automated fashion in a factory setting. For example, the various steps of the methods may be performed using an automated conveyer belt system in which the tiles move through the various heating and spraying steps on the conveyer belt. For example, sprayers for applying the heat reflective coatings as described herein may be on either or both sides of the heating element. Along these lines, in embodiments in which a coating is applied prior to drying/curing/hardening of the tiles the sprayer may be on the "wet side" of the heating element, i.e., spraying the tiles on the conveyer belt before the tiles move into the heating element; and if the coating is applied after drying/curing/hardening of the tiles the sprayer may be on the "dry side" of the heating element, i.e., spraying the tiles on the conveyer belt after the tiles move out of the heating element. In embodiments where the heat reflective coatings are applied to the tiles both before and after the tiles are dried/cured/hardened, there may be sprayers on both the wet and dry side of the heating element used to cure the tiles.

In various aspects and embodiments of the compositions and methods described herein, a coating may have a heat reflective metal oxide pigment. In some embodiments, a coating has a heat reflective metal oxide pigment at a concentration between about 0.1-12% by weight. In some embodiments, a coating has a heat reflective metal oxide pigment at a concentration between about 0.1-6% by weight. In some embodiments, a coating has a heat reflective metal oxide pigment at a concentration between about 0.1-2%; or about 0.1-3%; or about 0.1-4%; or about 0.1-5%; or about 1-6%; or about 2-6%; or about 3-6%; or about 4-6%; or about 4-8%; or about 5-7%; or about 6-12%; or about 7-12%; or about 8-12%; or about 9-12%; or about 10-12% by weight.

In some embodiments provided is a substrate (such as a metal substrate (e.g., metal panel), EIFS, or stucco bottom coat(s)) having a thick top or finish coating (greater than about 5, 10, 12, 15 etc., mils dry film thickness) that includes a heat reflective metal oxide pigment at a concentration between about 0.1-6% by weight. In some embodiments provided is a substrate (such as a metal substrate or other substrate) having a thick coating (greater than about 5, 10, 12, 15 etc., mils dry film thickness) that includes a heat reflective metal oxide pigment at a concentration between about 0.1-6% by weight. In some embodiments provided is a substrate (such as a metal panel) having a thick coating (greater than about 5, 10, 12, 15 etc., mils dry film thickness) that includes a heat reflective metal oxide pigment at a concentration between about 0.1-6% by weight. In some embodiments provided is a substrate (such as a metal substrate or other substrate) having a thick coating (greater than about 5, 10, 12, 15 etc., mils dry film thickness) that includes a heat reflective metal oxide pigment at a concentration between about 0.1-4% by weight. In some embodiments provided is a substrate (such as a metal substrate or other substrate) having a thick coating (greater than about 5, 10, 12, 15 etc., mils dry film thickness) that includes a heat reflective metal oxide pigment at a concentration between about 0.1-3% by weight. In some embodiments provided is a substrate (such as a metal substrate or other substrate) having a thick coating (greater than about 5, 10, 12, 15 etc., mils dry film thickness) that includes heat reflective pigment that is in a concentration that is less than 75%, or less than 60%, or less than 50%, or less than 40% of that required to achieve a reflectivity that is the same or similar to a thin (about 4 mils or less dry film thickness) coating of the same or similar color.

The term "about" as used herein means in quantitative terms plus or minus 10%. For example, "about 3%" would encompass 2.7-3.3% and "about 10%" would encompass 9-11%. Moreover, where "about" is used herein in conjunction with a quantitative term it is understood that in addition to the value plus or minus 10%, the exact value of the quantitative term is also contemplated and described. For example, the term "about 3%" expressly contemplates, describes and includes exactly 3%. Where about is used in conjunction with a range, it is understood that the term applies to both the upper and lower limits of the range.

The phrase "energy consumption" refers to the usage or consumption of conventional forms of energy, e.g., electricity, gas, etc. Thus, the reduction of energy consumption in a building pertains to lower usage of, for example, electricity in said building compared to the same building lacking the coating.

The phrase "coating" as a verb refers to applying, layering, or covering a substrate with a substance such as a paint or finish. As a noun "coating" refers to a substance such as a paint or finish to cover or coat a substrate.

In some aspects and embodiments, provided are textured coatings having a texturing material, for example, methods and compositions are provided pertaining to textured coatings that can be applied robotically or in an automated fashion. In various aspects and embodiments, textured coatings are provided that include a texturing material and a heat reflective metal oxide pigment.

The phrase "textured coating" refers to a coating having a texturing material such as described herein to give the coating a rough, bumpy or otherwise not smooth surface when applied. In contrast, a "smooth coating" as used herein refers to a coating that does not have a texturing material and therefore results in a smooth finish when coated on a surface. In some embodiments, a textured coating of the present disclosure resembles concrete or stucco when coated on a substrate, for example when coated on a metal substrate (e.g. metal panel), EIFS or as a stucco topcoat. In some embodiments the coating is sprayed using appropriate pressure to yield a thick, dry film where the profile of aggregate is clearly visible. In some embodiments, the texturing material accounts for at least about 3% of the textured coating formulation. In some embodiments, the texturing material accounts for at least about 4%; or about 5%; or about 6%; or about 7%; or about 8%; or about 9%; or about 10%; or about 15%; or about 20%; or about 25%; or about 50% of the textured coating formulation. In some embodiments, the texturing material accounts for about 4-60% of the textured coating formulation. In some embodiments the texturing material accounts for about 4-25%; or about 4-10%; or about 10-50%; or about 10-30%; or about 40-60%; or about 25-55%; or about 30-60%%; or about 45-60%; or about 30-50%; or about 20-35% of the textured coating formulation.

The phrase "texturing material" (also referred to as "texturing agent") refers to a material or aggregate that when added to a coating adds a texture to the coating, In various embodiments, a texturing material is or includes solid particles; for example the particles of a texturing material may be about 20-2000 microns. In some embodiments, the particles are of a size necessary to show a rough profile on the surface of the coating such that it resembles concrete or stucco. In some embodiments, the particles of the texturing material may include particles that are about 20-300 microns; or about 20-100 microns; or about 20-75 microns; or about 20-50 microns; or about 50-400 microns; or about 50-200 microns; or about 50-100 microns; or about 100-500 microns; or about 100-400 microns; or about 100-300 microns; or about 100-200 microns; or about 200-500 microns; or about 300-500 microns; or about 400-500 microns. In some embodiments the particles of the texturing material may be about 500-2,000 microns; or about 700-2,000 microns; or about 1,000-2,000 microns, or about 1,300-2,000 microns; or about 1,500-2,000 microns; or about 600-1700 microns; or about 1,000-1500 microns; or about 1,200-1,700 microns; or about 1,200-1,500 microns. A texturing material of the present methods and compositions may in some embodiments be one or more selected from silica, silica sand or quartz, calcium carbonate, granite, marble, perlite, pumice, limestone, waxes, hard resins, and plastics such as polypropylene, vinyl or polyethylene, or the like. A "non-abrasive texturing material" is a texturing material that is relatively rounder, softer and/or less abrasive and thus is suitable for use in textured coatings applied by sprayers, including automated sprayers. In this regard, the particles of abrasive texturing materials (for example, silica, silica sand, quartz, calcium carbonate, granite, marble, or limestone) have sharp corners and/or edges whereas in contrast non-abrasive texturing material are rounder and do not have such sharp corners that abrasive texturing materials have. The sharp corners and/or edges of the abrasive texturing materials can clog, damage and/or interfere with sprayers, including automated sprayers; accordingly textured coatings that have non-abrasive texturing materials in some embodiments have advantages over textured coatings having abrasive texturing materials, for example advantages in spray application, including automated spray application. In some embodiments, a non-abrasive texturing material is or includes one or more selected from perlite, pumice, vermiculite, and wax. In some embodiments, a non-abrasive texturing material is or includes perlite or pumice. In some embodiments, a non-abrasive texturing material is or includes pumice. In some embodiments, a non-abrasive texturing material is or includes perlite. In some embodiments, a non abrasive texturing material is or includes a mixture of pumice and perlite. In some embodiments a non-abrasive texturing material is not or does not include one or more of silica, silica sand, quartz, calcium carbonate, granite, marble, or limestone.

The phrase "paint" refers to a fluid binder liquid composition, i.e. resin and solvent, used for coating, applying, layering, or covering a substrate. Paints may be clear, colored, transparent, or nearly transparent. Paints embrace varnishes, stains, and finishes. Paints may be in any suitable formulation for application to a substrate, such as water-based, oil-based, or acrylic-based formulations.

The phrase "substrate" means any material to which a coating (for example a textured coating or a smooth coating) may be applied. In certain embodiments a substrate may be wood, dry wall, plaster, metal, stone, plastic, fiberglass, concrete, clay or the like. In certain embodiments, a substrate as disclosed herein is a material for use in external vertical walls and/or a material for use as a roofing material. In some embodiments, a substrate of the present disclosure is a metal substrate, including a metal panel, for example an architectural metal panel used for external walls. The phrase "external vertical walls" refers to the exterior surface of any upright, vertical or nearly vertical structure construction forming an exterior siding of a structure, building, vehicle or the like. Vertical walls may be composed of masonry, wood, plaster, or any other suitable building material. Typically, a building possess at least four vertical walls. In some embodiments, the substrate is a EIFS. In other embodiments, the substrate is a stucco bottom coat. In some embodiments, a substrate is a concrete or clay tile, for example a concrete or clay roofing tile.

A metal panel for use in any of the present compositions and methods can be an insulated metal panel having a layer of an insulation material, including such insulated metal panels used architecturally for external walls or a roof. In certain embodiments, a metal panel is for an external wall. The insulation material of an insulated metal panel can be a foam (such as a urethane based foam) that may be present as a layer or as a foam core. In some embodiments, the metal panel is a "single skin" architectural metal panel that does not have any foam insulation. In some aspects and embodiments of the methods and compositions disclosed herein, the metal panel is made from one or more materials selected from the group consisting of aluminum, steel, zinc, and copper or combinations and formulations thereof; in some embodiments the metal panel is galvalume. In various embodiments the metal panels may be either smooth or embossed. In some embodiments the panels are about 6 feet to about 30 feet in length. In various embodiments the panels may be about 6-10 feet; or about 6-12 feet; or about 6-20 feet; or about 10-25 feet; or about 10-20 feet; or about 10-15 feet; or about 10-30 feet; or about 15-30 feet; or about 20-30 feet; or about 25-30 feet in length. The panels can be made with inner locking mechanisms and can be used for exterior cladding of building structures. The metal panels of the present disclosure may be factory primed with a polyester or epoxy coating that can be any of a number of colors including white. In some embodiments, the polyester or epoxy coating is less than about 50 microns thick; or less than about 30 microns thick; or less than about 25 microns thick; or less than about 20 microns thick; or less than about 15 microns thick; or less than about 12 microns thick. In some embodiments, the polyester or epoxy coating is about 25 microns thick. In some embodiments, the polyester or epoxy coating is about 12 microns thick. In some embodiments a heat reflective coating such as described herein is applied directly over the polyester or epoxy factory primer with no additional primer applied. In some embodiments of the compositions and methods described herein, the primer is not white.

The term "EIFS" as used herein refers to an "exterior insulation finishing system" as is well known in the art of building materials and construction. EIFS is an exterior wall system that includes an insulation layer with a finished surface in an integrated composite material system. EIFS usually includes (1) a layer of foam insulation, (2) a reinforced layer that is usually a mesh such as a fiberglass mesh embedded in a cementitious adhesive and (3) a final topcoat, often called a finish. The foam insulation layer can in some embodiments be any insulating material, including foam plastic insulation such as expanded polystyrene (EPS). In some embodiments, the foam insulation layer is 1 pound density EPS. In some embodiments the foam insulation layer (such as EPS, including 1 pound density EPS) is about ¾" to 4" thick; or about 1" to about 3½" thick; or about 1' to 3" thick; or about 1½" to about 2½" thick; or about 2" to 4" thick; or about ¾" thick; or about 1" thick; or about 1½" thick; or about 2" thick; or about 2½" thick; or about 3" thick; or about 3½" thick; or about 4" thick. In some embodiments the reinforced layer is a fiberglass mesh; for example an open weave fiberglass mesh. In some embodiments the reinforced layer is a mesh (such as fiberglass) that is between about 2 oz to 20 oz; or about 4 oz to 20 oz; or about 4 oz to 15 oz; or about 4 oz to 8 oz; or about 2 oz to 4 oz; or about 4 oz to 6 oz; or about 6 oz to 8 oz; or about 8 oz to 12 oz; or about 8 oz to 10 oz; or about 10 oz to 12 oz; or about 12 oz to about 16 oz; or about 12 oz to 14 oz; or about 14 oz to 16 oz; or about 16 oz to 20 oz; or about 16 to about 18 oz; or about 18 to 20 oz. The topcoat may be textured and/or colored. In some embodiments a coating described herein (including a coating that is textured and/or includes heat reflective pigments) may be the final topcoat or in certain embodiments a coating as described herein is applied on top of the topcoat of an EIFS. EIFS as contemplated herein may have a drainage system, for example a water resistive barrier below the insulation layer (often referred to as "EIFS with Drainage" or "water managed EIFS." In some embodiments, EIFS is in panels, for example 2'×4' panels. A coating as described herein (including a coating that is textured and/or includes heat reflective pigments) may be applied to EIFS either in the factory or on site once on the building. The coating as described herein may in some embodiments be applied by spraying (including automated spraying), by a roller, with a trowel, or using any other method for applying coatings.

The term "stucco" refers to a decorative coating for walls as is well known in the art. Stucco is generally made of an aggregate, a binder and water. Stucco may additionally include fibers and/or synthetic acrylics. Stucco as used herein includes coatings referred to as plaster or mortar. In various embodiments stucco may include a mix that includes one or more of sand, Portland cement, lime and water. In some embodiments, stucco may have three coats: (1) a scratch coat (a bottom coat in which a brush or other instrument is used to scratch the surface horizontally or in a crisscross fashion to create a key for the next coat to grip onto, (2) a "brown coat" applied onto the scratch coat that is applied with a smooth finish and (3) a topcoat or finish coat. Three coat stucco is often used for systems in which the stucco is applied to a lath substrate. In some embodiments (for example where stucco is applied directly to masonry or concrete) the stucco has two coats, a basecoat and a topcoat. The stucco topcoat (also referred to as a finish coat) generally provides the desired color and texture of the stucco. The term stucco bottom coat refers to the coating (stucco scratch coat, brown coat or base coat) to which a stucco top coat is applied. Stucco topcoats are traditionally applied using a trowel, however, some of the aspects and embodiments disclosed herein are based at least in part on the surprising discovery that certain coatings as described herein (with and without heat reflective pigments) can be effectively applied as stucco topcoats by spraying achieving a suitable stucco appearance and surface.

In some aspects and embodiments of the present disclosure a textured coating is applied to a substrate using an automated sprayer. The phrase "automated sprayer" (also often referred to as a robotic sprayer) is well understood to those of ordinary skill in the art and refers to a paint sprayer that applies a coating to a substrate (such as a metal panel or EIFS) without a human holding the sprayer and performing a spraying action. In some embodiments, an automated sprayer is an apparatus consisting of either a gravity feed hopper, pressure pot, or siphon pump, air assisted or not with fluid hose and spray gun with tip that delivers product at a given thickness and spray pattern. In some embodiments, the automated sprayer system includes: 1.) ¾" fluid hose 2.) Pressure pot capable of producing 70 PSI, and Graco 204-000 texture gun supplied with 30 PSI air and 3.) ⅛" "Buck Rogers" style tip.

The phrase "quick set resin" refers to a resin that has a mechanism to cause it to set faster than non-quick set resins. In some embodiments, a quick set resin of the methods and compositions of the present disclosure has a pH based quick set mechanism; for example a quick set resin may be an acrylic emulsion that in its wet form has ammonia and a relatively high pH, and as the resin dries the ammonia evaporates causing the pH to drop and the resin to cross link. In some embodiments the quick set resin is Rhoplex EI-3500 from Dow Chemicals and is an acrylic latex emulsion which is 40%-60% solids as supplied by weight. In some embodiments, the quick set resin is Rhoplex CS-4000. In some embodiments the quick set resin is Rhoplex EC-1791 QS. In some embodiments the quick set resin is Neocryl XK-98, for example in certain embodiments where better adhesion to metal substrate (such as metal panels) is desired. In some embodiments, the ammonia in a quick set resin is replaced with a different volatile amine or other volatile component, for example, in the case that a low odor version of existing ammonia-based quick set resins or new formulations of low odor resins. In some embodiments, the quick set resin includes a non-ammonia volatile amine or other volatile component and in certain embodiments may not include any ammonia.

The phrase "heat reflective" refers to an ability to reflect solar light from a surface. Reflectance or reflectivity is expressed in terms of percentage of incident solar light that is reflected away from a surface. Preferably, external vertical walls coated with the present wall paint compositions exhibit an infrared reflectance above 30%, preferably above 50%, and preferably above 70%.

The phrase "heat reflective" also embraces an emissivity property, defined as the ability to radiate or emit energy in the form of longwave infrared radiation. Emissivity values range from zero to one, wherein values closer to one correlate with lower effectiveness of the surface at impeding radiant heat transfer. Consequently, surfaces with low emissivity values also exhibit lower surface temperatures.

Preferably, external vertical walls coated with the present wall paint compositions have lowered surface temperatures by at least 20° F., preferably by at least 30° F., preferably by at least 40° F., and preferably by at least 50° F. Factors which may affect measurements of surface temperature include, for example, angle of sunlight, time of day, time of year, and climatic conditions.

The phrase "metal oxide" refers to oxygen containing species of various metals, such as aluminum, antimony, bismuth, boron, chrome, cobalt, gallium, indium, iron, lanthanum, lithium, magnesium, manganese, molybdenum, neodymium, nickel, niobium, silium, tin, vanadium, or zinc. Preferable metal oxides that may be employed according to the invention include $Cr_2O_3$, $Al_2O_3$, $V_2O_3$, $Ga_2O_3$, $Fe_2O_3$, $Mn_2O_3$, $Ti_2O_3$, $In_2O_3$, $TiBO_3$, $NiTiO_3$, $MgTiO_3$, $CoTiO_3$, $ZnTiO_3$, $FeTiO_3$, $MnTiO_3$, $CrBO_3$, $NiCrO_3$, $FeBO_3$, $FeMoO_3$, $FeSn(BO_3)_2$, $BiFeO_3$, $AlBO_3$, $Mg_3Al_2Si_3O_{12}$, $NdAlO_3$, $LaAlO_3$, $MnSnO_3$, $LiNbO_3$, $LaCoO_3$, $MgSiO_3$, $ZnSiO_3$, or $Mn(Sb,Fe)O_3$.

The phrase "corundum-hematite crystal lattice structure" refers to a discrete crystalline structure exhibited by metal oxide pigments presented herein. Corundum-hematite crystalline structures can be obtained by using certain metal oxides, or precursors thereof, which form corundum-hematite lattice as host components and incorporating into them as guest components metal oxides or precursors thereof. Such corundum-hematite crystalline structures and methods of producing metal oxides of such structures are well known in the art and are described, for example, in U.S. Pat. Nos. 6,174,360, 6,454,848, and 6,616,744, the disclosures of all of which are incorporated herein by reference. Additionally, a host component having a corundum-hematite crystalline structure which contains as a guest component one or more elements from the group consisting of aluminum, antimony, bismuth, boron, chrome, cobalt, gallium, indium, iron, lanthanum, lithium, magnesium, manganese, molybdenum, neodymium, nickel, niobium, silium, tin, vanadium, and zinc may be used in the present wall paint compositions.

The term "spinel" and spinel pigments are metal oxide pigments well known to those in the art. Spinel is a crystalline structure having a cubic or isometric crystal system. Spinels include without limitation aluminum spinels, iron spinels, and chromium spinels.

The phrase "infrared wavelengths" refers to wavelengths of light in the infrared region. Wavelengths in the infrared region range from 750 to 2500 nm, such as from 800 to 2450 nm, such as from 900 to 2400 nm, such as from 1000 to 2300 nm, such as from 1500 to 2000 nm.

The phrase "white" refers to an achromatic color of maximum lightness, e.g., a color which reflects nearly all (at least 80%, preferably 90% and most preferably 95%) light of all visible wavelengths. For example, in preferred embodiments, heat reflective wall paint compositions presented herein are not white. Preferably, the present wall paints are of a dark color (i.e. of a shade tending toward black in comparison with other shades), such as black, blue, green, yellow, red, or any combination thereof. Thus, external vertical walls can be painted with a variety of colored wall paint compositions presented herein. Advantageously, external vertical walls coated with paint compositions of the present invention need not be white in order to exhibit a lower surface temperature.

Multiple metal oxide pigments may be mixed together to obtain coating compositions of a desired hue, so long as the heat reflective property of the resultant composition is maintained. In addition, colored pigments other than heat reflective metal oxide pigments may be added to the present wall paint compositions, such as C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof. The particular choice of pigments can be selected so as to impart superior weatherability, color retention, and low gloss uniformity to coated external vertical walls when exposed to high ultra violet sunshine.

In an aspect of the disclosure, methods of painting substrates for external vertical walls of a building (such as metal substrates, architectural metal panels, EIFS or a stucco bottom coat) by applying a heat reflective wall paint, containing at least one heat reflective metal oxide pigment, are presented herein. Preferably, such methods are used to paint the external walls of a residential building, e.g., house or a commercial building. The present coatings may be applied to external vertical walls in a single coat, and can be applied with or without the use of a primer. Walls coated with the present wall paints exhibit enhanced weathering and durability, and can reduce chipping, flaking, and peeling. The present wall paints and coatings may be applied to vertical walls composed of, for example, wood, metal, EIFS, stucco (such as stucco bottom coat), or brick.

Another aspect of the disclosure is directed to compositions of paint for application to substrates used for external vertical walls such as architectural metal panels, and at least one heat reflective metal oxide pigment.

In one aspect, provided is a textured coating composition that includes a heat reflective metal oxide pigment and a texturing material; as well as methods of coating a substrate by applying such textured coating having a heat reflective metal oxide pigment and a texturing material to the substrate. In some embodiments the substrate to which the textured coating having a heat reflective metal oxide pigment and a texturing material is a metal substrate such as a metal panel. In some embodiments the substrate to which the textured coating having a heat reflective metal oxide pigment and a texturing material is EIFS. In some embodiments the substrate to which the textured coating having a heat reflective metal oxide pigment and a texturing material is a stucco bottom coat.

In another aspect of the present disclosure, provided are methods of applying a coating that includes a heat reflective metal oxide pigment to a metal substrate, wherein the metal substrate has no primer or has only a polyester or epoxy primer that is less than about 30 microns thick. In a similar aspect, provided is a metal substrate such as a metal panel that include a coating that includes a heat reflective metal oxide pigment and either no primer only a polyester or epoxy primer that is less than about 30 microns thick.

In one aspect, provided is a single skin metal panel having a textured coating as described herein and a heat reflective metal oxide pigment.

In one aspect, provided are methods that include applying a textured coating having a non-abrasive texturing material to a substrate including a metal substrate (e.g., a metal panel), EIFS or as a stucco topcoat. Also provided is a metal substrate (e.g., metal panel), EIFS or stucco that includes a non-abrasive texturing material, for example one or more texturing materials selected from the group consisting of pumice and perlite. In a related aspect, provided are methods of applying a textured coating (for example a textured coating having a non-abrasive texturing material) using a sprayer. In a related aspect, provided are methods of applying a textured coating (for example a textured coating having a non-abrasive texturing material) using an automated sprayer. In some embodiments, the non-abrasive texturing material is one or more materials selected from the group consisting of pumice and perlite. In some embodiments, the textured coating having a non-abrasive texturing material is applied to a substrate using an automated sprayer. In some embodiments the methods include applying a textured coating (for example a textured coating having a non-abrasive texturing material) to a substrate (such as a metal substrate including a metal panel or EIFS or other substrate) using an automated sprayer. In some embodiments, the textured coating having a non-abrasive texturing material further includes a heat reflective metal oxide pigment; in other embodiments the textured coating having a non-abrasive texturing material does not include a heat reflective metal oxide pigment. In some embodiments the methods include applying a textured coating (for example a textured coating having a non-abrasive texturing material such as for example pumice and/or perlite) to a metal panel or EIFS or other substrate using an automated sprayer; wherein the texturing material of the textured coating has a particle size of about 700 microns or less. In some embodiments the methods include applying a textured coating (for example a textured coating having a non-abrasive texturing material such as for example pumice and/or perlite) to a metal panel or EIFS or other substrate using an automated sprayer; wherein the texturing material of the textured coating has a particle size of about 600 microns or less. In some embodiments the methods include applying a textured coating (for example a textured coating having a non-abrasive texturing material such as for example pumice and/or perlite) to a metal panel or EIFS or other substrate using an automated sprayer; wherein the texturing material of the textured coating has a particle size of less than about 400 microns. In some embodiments the methods include applying a textured coating (for example a textured coating having a non-abrasive texturing material such as for example pumice and/or perlite) to a metal panel or EIFS or other substrate using an automated sprayer; wherein the texturing material of the textured coating has a particle size of about 150-600 microns. In some embodiments the methods include applying a textured coating (for example a textured coating having a non-abrasive texturing material such as for example pumice and/or perlite) to a metal panel or EIFS or other substrate using an automated sprayer; wherein the texturing material of the textured coating accounts for about 4-60% of the textured coating and has a particle size of about 700 microns or less. In some embodiments the methods include applying a textured coating (for example a textured coating having a non-abrasive texturing material such as for example pumice and/or perlite) to a metal panel or EIFS or other substrate using an automated sprayer; wherein the texturing material of the textured coating accounts for about 4-60% of the textured coating and has a particle size of about 600 microns or less. In some embodiments the methods include applying a textured coating (for example a textured coating having a non-abrasive texturing material such as for example pumice and/or perlite) to a metal panel or EIFS or other substrate using an automated sprayer; wherein the texturing material of the textured coating accounts for about 4-60% of the textured coating and has a particle size of less than about 400 microns. In some embodiments the methods include applying a textured coating (for example a textured coating having a non-abrasive texturing material such as for example pumice and/or perlite) to a metal panel or EIFS or other substrate using an automated sprayer; wherein the texturing material of the textured coating accounts for about 4-60% of the textured coating and has a particle size of about 150-600 microns.

Also provided herein are methods and compositions that improve the speed of a coating to dry or set following application. Accordingly, in one aspect, provided are methods that include applying a coating that includes a quick set resin to a metal panel or EIFS or other substrate and/or compositions that include a metal panel or EIFS or other substrate with a coating that includes a quick set resin. In another aspect, provided is a textured or smooth coating composition that includes a heat reflective metal oxide pigment and a quick set resin. In some embodiments the quick set resin has a pH based quick set mechanism. In certain embodiments the quick set resin is Rhoplex EI-3500.

In certain embodiments of any of the aspects or embodiments provided herein, a coating having a heat reflective metal oxide pigment is applied to a substrate without any white or near white primer.

In some embodiments of any of the aspects or embodiments provided herein, a coating for application to a substrate such as a metal panel has at least one heat reflective metal oxide pigment and is textured to resemble concrete or stucco. In some exemplary embodiments a textured coating having a concrete look includes ground limestone or similar texturing material with particle sizes of about 600-1,700 microns and extender pigments such as calcium carbonate to achieve a course textured matte finish. The concrete textured coating may be applied to the surface of about 15-35 mils dry film thickness. In some preferred embodiments, the color of a concrete-look finish is grey or tan. In some exemplary embodiments a textured coating having a stucco look may include both pumice (having particle sizes of, for example, of about 300-600 microns) and perlite (having particle sizes, for example of about 150-400 microns) and extender pigments such as calcium carbonate to achieve a semi-course textured matte finish. In some embodiments the stucco-look coating may be applied at about 10-18 mils dry film thickness.

In one aspect, provided is a metal substrate (e.g., metal panel) having a heat reflective coating on the surface; wherein the coating is about 10-35 mils dry film thickness and comprises a heat reflective metal oxide pigment at a concentration between 0.1-12% by weight of the coating. In one embodiment, provided is a metal substrate (e.g., metal panel) having a heat reflective coating on the surface; wherein the textured coating is about 11-35 mils dry film thickness and comprises a heat reflective metal oxide pigment at a concentration between 0.1-6% by weight of the coating. In some embodiments of this aspect the textured coating includes a quickset resin as described herein. In some embodiments, the metal substrate (e.g., metal panel) does not have a white or near-white primer or coating under the heat reflective coating. In some embodiments of this aspect, the heat reflective coating of this aspect does not include any texturing material or includes a texturing material at a concentration of less then about 3%.

In one aspect provided is a metal substrate (e.g., metal panel) having a textured coating on the surface; wherein the textured coating is about 10-35 mils dry film thickness, comprises a heat reflective metal oxide pigment at a concentration between 0.1-12% by weight of the textured coating, and comprises a texturing material having particle sizes of about 20-2000 microns in a concentration of about 4-60% by weight of the textured coating. In one embodiment provided is a metal substrate (e.g., metal panel) having a textured coating on the surface; wherein the textured coating is about 11-35 mils dry film thickness, comprises a heat reflective metal oxide pigment at a concentration between 0.1-6% by weight of the textured coating, and comprises a texturing material having particle sizes of about 20-1,500 microns in a concentration of about 4-60% by weight of the textured coating. In one embodiment provided is a metal substrate (e.g., metal panel) having a textured coating on the surface; wherein the textured coating is about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating. In one embodiment provided is a metal substrate (e.g., metal panel) having a textured coating on the surface; wherein the textured coating is about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating, wherein the texturing material is one or more selected from the group consisting of perlite and pumice. In some embodiments of this aspect the textured coating includes a quickset resin as described herein. In some embodiments, the metal panel does not have a white or near-white primer or coating under the textured coating.

In one aspect, provided is EIFS having a heat reflective coating on the surface; wherein the coating is about 10-35 mils dry film thickness and comprises a heat reflective metal oxide pigment at a concentration between 0.1-12% by weight of the coating. In one embodiment, provided is EIFS having a heat reflective coating on the surface; wherein the textured coating is about 11-35 mils dry film thickness and comprises a heat reflective metal oxide pigment at a concentration between 0.1-6% by weight of the coating. In some embodiments of this aspect the textured coating includes a quickset resin as described herein. In some embodiments, the EIFS does not have a white or near-white primer or coating under the heat reflective coating. In some embodiments of this aspect, the heat reflective coating of this aspect does not include any texturing material or includes a texturing material at a concentration of less then about 3%.

In one aspect provided is EIFS having a textured coating on the surface; wherein the textured coating is about 10-35 mils dry film thickness, comprises a heat reflective metal oxide pigment at a concentration between 0.1-12% by weight of the textured coating, and comprises a texturing material having particle sizes of about 20-2000 microns in a concentration of about 4-60% by weight of the textured coating. In one embodiment provided is EIFS having a textured coating on the surface; wherein the textured coating is about 11-35 mils dry film thickness, comprises a heat reflective metal oxide pigment at a concentration between 0.1-6% by weight of the textured coating, and comprises a texturing material having particle sizes of about 20-1,500 microns in a concentration of about 4-60% by weight of the textured coating. In one embodiment provided is EIFS having a textured coating on the surface; wherein the textured coating is about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating. In one embodiment provided is EIFS having a textured coating on the surface; wherein the textured coating is about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating, wherein the texturing material is one or more selected from the group consisting of perlite and pumice. In some embodiments of this aspect the textured coating includes a quickset resin as described herein. In some embodiments, the EIFS does not have a white or near-white primer or coating under the textured coating.

In one aspect provided is a wall having a stucco topcoat, wherein the topcoat is about 10-35 mils dry film thickness and comprises a heat reflective metal oxide pigment at a concentration between 0.1-12% by weight of the coating. In one embodiment, provided a wall having a stucco topcoat; wherein the topcoat is about 11-35 mils dry film thickness and comprises a heat reflective metal oxide pigment at a concentration between 0.1-6% by weight of the coat. In embodiment provided is a wall having a stucco topcoat; wherein the topcoat is about 10-35 mils dry film thickness, comprises a heat reflective metal oxide pigment at a concentration between 0.1-12% by weight of the topcoat, and comprises a texturing material having particle sizes of about 20-2000 microns in a concentration of about 4-60% by weight of the topcoat. In one embodiment provided is a wall having a stucco topcoat; wherein the topcoat is about 11-35 mils dry film thickness, comprises a heat reflective metal oxide pigment at a concentration between 0.1-6% by weight of the topcoat, and comprises a texturing material having particle sizes of about 20-1,500 microns in a concentration of about 4-60% by weight of the topcoat. In one embodiment provided is a wall having a stucco topcoat; wherein the textured coating is about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating. In one embodiment provided is a wall having a stucco topcoat; wherein the topcoat is about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the topcoat, wherein the texturing material is one or more selected from the group consisting of perlite and pumice. In some embodiments, provided is a method of applying a stucco topcoat as described herein (including a stucco topcoat as described in this aspect) using a sprayer.

DETAILED DESCRIPTION OF THE PREFERRED EMBODIMENTS

Heat Reflective Metal Oxide Pigments

In accordance various aspects and embodiments of the methods and compositions provided herein, a coating or a paint may include at least one heat reflective metal oxide pigment. Heat reflective metal oxide pigments that are preferably used in the present coating compositions in some embodiments are sold by Ferro Corporation (Cleveland, Ohio) as Cool Colors™ & Eclipse™ pigments. Exemplary IR reflective pigments sold by Ferro Corporation include "new black" (Ferro product no. V-799), "old black" (Ferro product no. V-797), "turquoise" (Ferro product no. PC-5686), "blue" (Ferro product no. PC-9250), "camouflage green" (Ferro product no. V-12600), "IR green" (Ferro product no. V-12650), "autumn gold" (Ferro product no. PC9158), "yellow" (Ferro product no. PC-9416), and "red" (Ferro product nos. V-13810 and V-13815). In some embodiments of the compositions and methods disclosed herein, a heat reflective metal oxide pigment includes one or more selected from the group consisting of V-778 Black Hematite, V-780 Black Spinel, V-799 Black Spinel, 10204 Black Spinel, V-12650 Green, 10241 Green Hematite, 10358 Brown Spinel, V-9115 Yellow Spinel, 10520 Brown Spinel, 10363 Brown Spinel, V-9412 Nickel Titanate Yellow, V-9415 Nickel Titanate Yellow, V-9440 Nickel Titanate Yellow, V-9416 Nickel Titanate Yellow, V-9236 Blue Spinel, V-9250 Blue Spinel, 10446 Blue Spinel, F-5686 Blue Green Spinel, V-9248 Blue Spinel, V-11633 Green Spinel, V-12600 Green Spinel, and V-12604 Green Spinel, and 0364 Brown Rutile. In various embodiments of any of the compositions or methods disclosed herein, the heat reflective metal oxide pigment may include one or more pigments selected from the group consisting of pigments having a corundum-hematite crystal lattice structure, pigments having a spinel crystal lattice structure, and pigments having a nickel titanate rutile structure. In various embodiments of any of the compositions or methods disclosed herein, the heat reflective metal oxide pigment may include pigments having a corundum-hematite crystal lattice structure. In some embodiments of any of the compositions or methods disclosed herein, the heat reflective metal oxide pigment may include pigments having a spinel crystal lattice structure. In some embodiments of any of the compositions or methods disclosed herein, the heat reflective metal oxide pigment may include pigments having a nickel titanate rutile structure.

Heat reflective metal oxide pigments of the present compositions can be prepared by various methods known in the art. Preferably, these pigments are formed using one or more metal alloys that can be incorporated as cations into a corundum-hematite crystal lattice structure, a spinel crystal lattice structure, or a nickel titanate rutile structure For instance, one or more metal alloys is milled to a mean particle size of less than about 10 microns, mixed with other metal oxides, and then the mixture is calcined in the presence of oxygen in a rotary kiln at temperatures ranging from about 800° C. to about 1200° C. to form the pigment. U.S. Pat. No. 6,616,744, the disclosure of which is incorporated herein by reference, describes an exemplary method for forming metal oxide pigments employed in the present compositions and methods.

Heat reflective metal oxide pigments as disclosed herein may include at least one metal oxide pigment capable of reflecting light of infrared wavelengths. Spectroscopic methods for determining reflectance values of a solid substance, including metal oxide pigments, are well known in the art and include, for example, pressing a neat powder of the solid substance and placing the powder sample into a chamber of a spectrophotometer equipped with a reflectance spectroscopy accessory. Such reflectance spectroscopic methods are described, for example, in U.S. Pat. No. 6,454,848.

Coatings

Coating compositions of the present disclosure may be solvent-based, oil-based, or water-based. Solvent-based and oil-based wall paint formulations are well known in the art and include, for example, XL-70 with mineral spirit and toluene; styrene acrylic with aromatic 100 based solvent; vinyl acrylic with mineral spirits and aromatic 100 based solvent; and alkyd coating. Water-based wall paint formulations are well known in the art and include, for example, acrylic resin. In certain embodiments, the present wall paint compositions are water-based formulations comprising a 100% acrylic resin.

Preferably, coatings of the present disclosure include from 35-65% or 35 to 50% solids by weight, from 35-65% or 30 to 40% solids by volume, from 3 to 7% organic solvent, and from 0 to 30% weight percent pigment (pigments include metal oxide pigments, titanium dioxide, and fillers such as formed silica, titanium extenders, and clay). In certain embodiments, wall paint formulations of the invention comprise from 37 to 47% solids by weight, such as from 39 to 45% solids by weight, such as from 41 to 43% solids by weight. In certain embodiments, coating formulations include from 32 to 38% solids by volume, such as from 34 to 36% solids by volume. Preferably, coatings have a density from about 9.1 to about 10.8 pounds per gallon, such as from 9.5 to 10.5 pounds per gallon.

In certain embodiments the coatings of the present compositions and methods are TEX-COTE® SUPER-COTE™, which have varying sheen finishes called Satin Finish Enamel and Platinum Flat Finish, manufactured by Textured Coatings of America (Panama City, Fla.). Other preferred wall paint formulations manufactured by Textured Coatings of America include TEX-COTE® TRIM-COTE™, which have varying sheen finishes called Satin Finish and Semi-Gloss Finish. Both the SUPER-COTE™ and TRIM-COTE™ products from Textured Coatings of America comprise heat reflective metal oxide pigments, and can be used to paint substrates including materials for external vertical walls as well as trimmings on external vertical walls.

The TEX-COTE® SUPER-COTE™ and TRIM-COTE™ is a water-based system formulated with a 100% acrylic resin. Pigments in the TEX-COTE® formulation are selected to provide hide (e.g., coverage), superior weatherability, color retention and low gloss uniformity when exposed to high ultra violet exposure from sunshine. Infrared reflective pigments are added in the TEX-COTE® formulation to reduce heat built-up, to keep the coating cooler, and to save energy. Colors stay vibrant longer due to the infrared reflective pigments used in the SUPER-COTE™ and TRIM-COTE™ formulation. A synthetic flatting aid has been added to the TEX-COTE® formulation to sustain long term "satin finish". The rheology of the TEX-COTE® system provides flow, leveling and the necessary wet edge during application. The addition of infrared reflective pigments as well as ultraviolet and visible light stabilizers improves the weatherability of the TEX-COTE® coating.

Coating compositions of the present compositions and methods can further include various conventional paint additives, such as dispersing aids, anti-settling aids, wetting aids, thickening agents, extenders, plasticizers, stabilizers, light stabilizers, antifoams, defoamers, catalysts, texture-improving agents and/or antiflocculating agents. Conventional paint additives are well known and are described, for example, in "C-209 Additives for Paints" by George Innes, February 1998, the disclosure of which is incorporated herein by reference. The amounts of such additives are routinely optimized by the ordinary skilled artisan so as to achieve desired properties in the wall paint, such as thickness, texture, handling, and fluidity.

Coatings of the present methods and compositions may comprise various rheology modifiers or rheology additives (such as acrysol), wetting agents, defoamers, dispersants and/or co-dispersants, and microbicides and/or fungicides. To achieve enhanced weatherability, the present wall paints may comprise UV (ultra-violet) absorbers such as tinuvin.

Wall paint compositions of the present invention may further include heat reflective substances other than metal oxide pigments discussed herein. For instance, coating compositions may further comprise ceramic or elastomeric substances, which are heat and/or infrared reflective, so as to provide additional heat reflective benefits.

In some aspects and embodiments of any of the compositions and methods provided herein, a coating of the present disclosure may have heat reflective metal oxide pigments and a texturing material in a single coating composition. This differs from previous applications in which texturing materials were included in a bottom coat such as a primer and the heat reflective metal oxide containing coating was applied as a smooth topcoat. Including both the texturing materials and heat reflective metal oxide pigments in a single coating can, at least in some circumstances have certain advantages such as, for example, obviating the need for a textured primer, the ability to apply both texture and reflectivity in a single coat, and having the textured coating as the top outside coat. In embodiments where the heat reflective metal oxide pigments and textured coatings are included in a single coating, the coating may often be applied relatively thicker (e.g., more than 5 mils dry film thickness, or more than 10 mils dry film thickness, or more than 12 mils dry film thickness, or more than 15 mils dry film thickness) than the heat reflective coatings in situations where the heat reflective metal oxide coat is applied over a textured coating (in such circumstances the heat reflective metal oxide coat has generally been applied at a thickness of less than 5 mils dry film thickness).

In some embodiments, a heat reflective metal oxide pigment coating system as described herein includes or is a layer that offers increased weathering resistance and/or UV durability. Examples of such layers include without limitation acrylic, acrylic/copolymer blends, polyurethane acrylic systems, fluorinated resin systems, and the like. Fluorinated resin coating systems are well known in the art and include PVDF or FEVE systems. Polyvinylidene fluoride (PVDF) coatings are well known in the art and include Kynar® brand products (e.g., Kynar 500® coatings and Kynar Aquatic® coatings), REFLECT-TEC™ Coating systems that combing the Kynar Aquatic® technology with heat reflective metal oxide pigment technology, and the like.

In some embodiments, a coating system as described herein is or includes a polyurethane coating layer (e.g., a polyurethane top coat). In some embodiments the coating that includes heat reflective metal oxide pigments as described herein is a polyurethane coating layer. In some embodiments the polyurethane coating layer is above the coating layer having metal oxide heat reflective pigments as described herein. Polyurethane coatings are well known in the art. Polyurethane coating technology generally is based upon an isocyanate group (—N=C=O) that can react with a compound having a reactive hydrogen, for example an alcohol (R—OH), an amine (R—NH$_2$) and even water (H$_2$O). There are many hydroxyl and/or amine-containing raw materials (i.e., polyols or co-reactants) available for reaction with isocyanate containing raw materials. In some embodiments the polyurethane coating as described herein is a two component polyurethane coating. Two-component polyurethane coatings, are a type of polyurethane coating that is well known and understood to those in the art in the art. Two component polyurethane systems generally involve mixing two parts (often referred to as part A and part B) immediately prior to application. One of the parts is a resin that generally has reactive chemical groups (e.g., hydroxyls or amines). The second part of a two component polyurethane system includes one or more co-reactants. Co-reactants generally have at least two reactive hydrogens present to obtain polymerization. When either the co-reactant or the polyisocyanate has more than two reactive sites, a cross-linked, thermoset polymer is formed. Greater crosslinking results in a harder and more chemically resistant polymer. Co-reactants are generally characterized by their backbone chemistries, which can be polyester, polyacrylate (acrylic), polyether, vinyl, fluoro, polyaspartic, or even epoxy. Advantages of the two-component polyurethane coatings include long storage stability and rapid curing reactions once the two resins are mixed. A polyurethane coating may be characterized by the type of polyisocyanate incorporated into the coating (i.e., aromatic or aliphatic). Aromatic polyisocyanates (e.g., toluene diisocyanate [TDI] and methylene diphenyl diisocyanate [MDI]-derived polyisocyanates) may in some embodiments be advantageous due to the fact that they can be relatively less expensive. Aliphatic polyisocyanates (e.g., hexamethylene diisocyanate [HDI], isophorone diisocyanate [IPDI] and H12MDI-derived polyisocyanates) may in some embodiments be advantageous due to relatively improved weathering characteristics, for example, improved retention of color and gloss.

Application of Coatings

Coatings of the present disclosure may be applied to a substrate using a variety of well known methods, such as brush, roller, trowel or commercial grade airless sprayer. For instance, platinum SUPER-COTE™ may be applied in some embodiments at 8 mils (1 mil=0.001 inch) wet film thickness, or in certain embodiments for certain textures, the coating is applied at about 6-10 mils wet film thickness. This is approximately equivalent to 2.8 to 3.8 dry mils film thickness. In certain embodiments, coverage rates for SUPER-COTE™ may vary in certain embodiments from about 160 to about 250 square feet per gallon depending on surface porosity and texture. In some embodiments the coatings of the methods and compositions disclosed herein, the coatings are applied between 30-50 square feet per gallon. Representative procedures for applying SUPER-COTE™ are described in the examples below.

Coating compositions presented herein may be applied as many times necessary so as to achieve sufficient coating of external vertical walls. For example, in some embodiments, wall paint may be applied from about 8 mils to about 10 mils wet film thickness, which is equivalent to from about 2.8 to about 3.8 dry mils film thickness.

In certain embodiments, a coating in accordance with the present methods and compositions (including coatings having a heat reflective metal oxide pigment) may be applied at a thickness that is greater than 5 mils dry film thickness; or greater than 8 mils dry film thickness; or greater than 10 mils dry film thickness; or greater than 11 mils dry film thickness; or greater than 12 mils dry film thickness; or greater than 13 mils dry film thickness; or greater than 14 mils dry film thickness; or greater than 15 mils dry film thickness; or greater than 16 mils dry film thickness; or greater than 17 mils dry film thickness; or greater than 18 mils dry film thickness; or greater than 19 mils dry film thickness. In this regard, the present inventors have found that in certain situations, a thicker coating having heat reflective pigments can result in improved heat reflective properties. In some embodiments, the inventors have found that it is possible to use a lower concentration of the heat reflective metal oxide pigment in coatings that are applied relatively thicker (such as greater than 5, or 10, or 12, or 15, mils etc., dry film thickness) can exhibit similar heat reflective properties as thinner coatings having a higher concentration of heat reflective pigments. For example, in some embodiments, a relatively thicker coating (such as greater than 5, or 10, or 12, or 15, mils etc., dry film thickness) has a concentration of heat reflective metal oxide pigment that is less than about 6%; or less than about 5%; or less than about 4%; or less than about 3%; or less than about 2% by weight; or between about 0.1-2%; or about 0.1-3%; or about 0.1-4%; or about 0.1-5%; or about 1-6%; or about 2-6%; or about 3-6%; or about 4-6% by weight. In some embodiments, the present inventors found that under certain circumstances when the coatings are applied at a thicker amount, the coatings exhibit similar heat reflective properties with and without a white primer, thus obviating a need for a white primer.

The coatings of the compositions and methods disclosed herein can in some situations be applied, for example, to external walls of a building on site. Alternatively, in the case of prefabricated materials such as architectural metal panels or EIFS, the coatings may be applied in a factory before shipping to a building site. In certain aspects and embodiment of the present disclosure, a coating such as described herein may be applied to a substrate robotically using an automated sprayer. In certain situations robotic our automated application of coatings may be advantageous in that it can reduce costs by reducing the manpower needed and in some situations can result in a more uniform and consistent coating due to the lack of human error an variation (this may be especially true in the case of textured coatings). Thus certain aspects and embodiments of the present disclosure relate to methods and compositions to reduce or prevent the texturing material interfering with the automated sprayers. As such in some embodiments, coatings (including coatings having heat reflective metal oxide pigments) having non-abrasive texturing materials (such as disclosed herein) that interfere less with automated sprayers are applied in an automated or robotic manner to a substrate such as a metal panel or EIFS. In certain specific embodiments, the non-abrasive texturing material is pumice and or perlite. In some embodiments, coatings (including coatings having heat reflective metal oxide pigments) having texturing materials with smaller particle sizes (for example less than 700 microns; or less than 600 microns; or less than 500 microns; or less than 400 microns; or less than 300 microns; or less than 200 microns) that interfere less with automated sprayers are applied in an automated or robotic manner to a substrate such as a metal panel. In some embodiments, coatings (including coatings having heat reflective metal oxide pigments) having non-abrasive texturing materials (such as disclosed herein and including without limitation perlite and/or pumice) with smaller particle sizes (for example less than 700 microns; or less than 600 microns; or less than 500 microns; or less than 400 microns; or less than 300 microns; or less than 200 microns) that interfere less with automated sprayers are applied in an automated or robotic manner to a substrate such as a metal panel or EIFS. In some embodiments, the texturing material of a textured coating for application in an automated or robotic manner is present in the coating at a concentration of less than 30%; or less than 25%; or less than 20%; or less than 15%; or less than 12%; or less than 10%; or between about 2-40%; or between about 10-30%; or between about 25-35%; or between about 20-30%; or between about 15-25%; or between about 10-20%; or between about 5-15% by weight of the coating.

In some embodiments, coatings (with or without heat reflective pigments) of the present disclosures (such as stucco coatings, coatings that have a stucco appearance on various substrates including metal panels or EIFS, or a stucco topcoat) may be applied in thicknesses disclosed herein using a trowel. In certain embodiments a stucco topcoat coating or a coating having a stucco appearance (with our without heat reflective pigments) such as described herein, is applied using a sprayer. In certain embodiments light weight stucco coatings (including stucco topcoats or coatings having a stucco appearance) as described herein, have surprising properties with regard to the ability to be spray applied and maintain a stucco appearance. In this regard, spray application of stucco coatings (including stucco topcoat coatings and coatings having a stucco appearance) may in certain situations have advantages over traditional trowel applications in that spray applications can reduce labor costs and can result in more consistent finished products. In related embodiments, provided are light weight stucco coatings (including stucco topcoat coatings and coatings having a stucco appearance) that can be applied by trowel or by spraying. In certain embodiments the light weight stucco coatings (including stucco topcoat coatings and coatings having a stucco appearance) include heat reflective metal oxide pigments as described herein. Light weight stucco coatings (including stucco topcoat coatings and coatings having a stucco appearance) can be applied in thicknesses as described herein and can be applied as stucco topcoats or as coatings on substrates such as metal panels or EIFS. In certain specific embodiments, a light weight stucco coating as described herein include a non-abrasive texturing material such as pumice and/or perlite. In some embodiments, the texturing material (such as perlite and/or pumice) of a light weight stucco coating is present in the coating at a concentration of less than 30%; or less than 25%; or less than 20%; or less than 15%; or less than 12%; or less than 10%; or between about 2-40%; or between about 10-30%; or between about 25-35%; or between about 20-30%; or between about 15-25%; or between about 10-20%; or between about 5-15%; by weight of the coating. In some embodiments, light weight stucco coatings (including coatings having heat reflective metal oxide pigments) have texturing materials with smaller particle sizes (for example less than 700 microns; or less than 600 microns; or less than 500 microns; or less than 400 microns; or less than 300 microns; or less than 200 microns). In some embodiments, light weight stucco coatings (including coatings having heat reflective metal oxide pigments) having non-abrasive texturing materials (such as disclosed herein and including without limitation perlite and/or pumice) with smaller particle sizes (for example less than 700 microns; or less than 600 microns; or less than 500 microns; or less than 400 microns; or less than 300 microns; or less than 200 microns) are applied in an automated or robotic manner to a substrate such as a metal panel or EIFS.

Primers

Coating compositions presented herein may be applied to a metal substrate after coating with primers. Exemplary primers include [polyester, epoxy, alkyd, or acrylic primers designed for metal adhesion and corrosion control and are applied in the field or in the factory] TEX-COTE® TEX-BOND™ Primer, a multi-functional low V.O.C. acrylic copolymer pigmented latex system. The TEX-BOND™ primer contains rheology modifiers to provide non-sag, leveling and film build when freshly applied. This product is ready to use where hard, slick surfaces are difficult to obtain adhesion. The TEX-BOND™ primer is also for use on PVC, ABS, tiles, painted or unpainted metal approved metal surfaces. Application rate is approximately 200-400 square feet per gallon via brush, spray or roller.

Another exemplary primer which may be optionally applied to a substrate before application of the present wall paint compositions is TEX-COTE™ METAL PRIME Primer, a corrosion resistant water based coating based on a cross-linking acrylic resin binder. This primer is formulated with corrosion resistant pigments and flash rust preventers to provide long-term corrosion protection to metal and adheres to bare steel, galvanize, aluminum, galvalume.

Metal Substrates Including Metal Panels

In some embodiments of the methods and compositions disclosed herein, the substrate to which a coating (such as a textured or smooth coating with or without heat reflective metal oxide pigments) is metal. In certain embodiments the metal is a metal panel, for example an architectural metal panel for external walls or roofing. In some embodiments, the metal panel is for external walls. Metal panels can be insulated or non-insulted single skin metal panels. In some aspects, the metal substrate is metal for use in a marine environment or for marine applications; for example the metal substrate may be present in the hulls, exterior walls, decks and/or fixtures of a boat or a ship; or the metal substrate may be present in or on a building, shed or structure in a marine environment (such as near water); the metal substrate may be present in or on a dock or similar structure; or the like. In some aspects and embodiments of the methods and compositions disclosed herein, the metal substrate (such as a metal panel) is made with one or more selected from the group consisting of aluminum, steel, zinc, and copper; in some embodiments the metal panel is galvalume.

In some embodiments, textured coatings as disclosed herein are applied to architectural metal panels (such as metal panels for exterior walls), for example to make the metal panels look like a material other than metal.

Many municipalities restrict the use of smooth metal panels on the visible portion of buildings, but will allow the use of textured metal panels resembling concrete or stucco. As such, in some embodiments, the coating is textured to look like cement or stucco. The use of single skin (non-insulated) panels is growing across the country due to the lower installation cost, but they are currently offered in a smooth finish only; accordingly, the present disclosure specifically provides single skin metal panels (such as for external walls) having a textured coating as described herein.

In some embodiments of the aspects and embodiments disclosed herein a metal substrate (including a metal panel) is coated with a coating having a heat reflective metal oxide pigment. Cooler exterior surface temperatures of metal panels having a heat reflective coating as described herein can allow less heat transfer into the building, structure or boat's interiors, thus reducing energy required for cooling a building, structure or boat having such metal substrates (including metal panels) on its exterior surfaces (such as walls and/or roofing). In some circumstances, coating a single skin metal panel with a heat reflective coating of the disclosure may obviate the need to use more expensive insulated panels. In the case of insulated panels, one problem that can occur is a loss of adhesion between the metal skin and the urethane foam core due to heat that is emitted through the panel from the exterior surface. Cooler surface temperatures caused by a heat reflective coating as described herein can prevent or reduce such panel-to-foam delamination from occurring. Heat reflective coatings as described herein can also be advantageous in that they may reduce fading and/or chipping and/or degradation that may occur with similar coatings that do not have heat reflective coatings.

In certain situations, the textured and/or heat reflective coatings as described herein are applied to metal panels in a factory setting and allowed to cure in the factory before shipping. In such situations it can be advantageous to apply the coatings robotically or in an automated fashion as described herein. Also, in such situations using a quick set resin as described herein also may confer certain advantages as it will allow cured panels to be shipped out of the factory sooner.

Non-Limiting List of Exemplary Embodiments

In addition to the aspects and embodiments described and provided elsewhere in this disclosure, the following non-limiting list of particular embodiments are specifically contemplated.

1. A textured coating composition comprising a heat reflective metal oxide pigment and a texturing material.

2. A method comprising applying a textured coating according to embodiment 1 to a substrate.

3. The method of embodiment 2, wherein said substrate is a metal panel.

4. The method of embodiment 2, wherein said substrate is EIFS.

5. The method of embodiment 2, wherein said substrate is a stucco bottom coat.

6. A method comprising applying a coating comprising a heat reflective metal oxide pigment to a metal substrate; wherein said metal substrate has a polyester or epoxy primer that is less than about 30 microns thick and has no other primer.

7. A metal panel comprising a polyester or epoxy primer coating that is less than about 30 microns thick and no other primer layer, and a coating that includes a heat reflective metal oxide pigment.

8. A composition comprising a substrate with a coating on the surface, wherein said coating comprises a heat reflective metal oxide pigment and is present on said surface at that is at least about 12 mils dry film thickness.

9. A method comprising applying a coating to the surface of a substrate at thickness of about 12 mils dry film thickness or more; wherein said coating comprises a heat reflective metal oxide pigment.

10. The method or composition of any of embodiments 8-9, wherein said coating is a textured coating.

11. The method or composition of any of embodiments 8-9, wherein said coating is a smooth coating.

12. The method or composition of any of embodiments 8-9, wherein said substrate is a metal panel.

13. The method or composition of any of embodiments 8-9, wherein said substrate is EIFS.

14. The method or composition of any of embodiments 8-9, wherein said substrate is a stucco bottom coat.

15. A method comprising applying a textured coating comprising one or more texturing materials selected from the group consisting of pumice and perlite to a metal substrate.

16. A method comprising applying a textured coating comprising one or more texturing materials selected from the group consisting of pumice and perlite to a metal panel, EIFS or as a stucco top coat.

17. A method comprising applying a textured coating comprising one or more texturing materials selected from the group consisting of pumice and perlite; wherein said textured coating is applied using an automated sprayer.

18. A method comprising applying a textured coating using an automated sprayer.

19. A method comprising applying a textured coating to a metal panel or EIFS; wherein said textured coating is applied using an automated sprayer.

20. A method comprising applying a textured coating to a metal panel; wherein said textured coating is applied using an automated sprayer; wherein said textured coating comprises one or more non-abrasive texturing materials selected from the group consisting of perlite and pumice; and wherein said texturing material consists essentially of particles having a particle size of less than 600 microns.

21. A method comprising applying a textured coating to a metal panel or EIFS; wherein said textured coating is applied using an automated sprayer; wherein said textured coating comprises one or more non-abrasive texturing materials selected from the group consisting of perlite and pumice; wherein said texturing material consists essentially of particles having a particle size of less than 600 microns and wherein said textured coating includes heat reflective metal oxide pigments.

22. A metal panel or EIFS comprising a textured coating that comprises one or more texturing materials selected from the group consisting of pumice and perlite.

23. A textured coating composition comprising a heat reflective metal oxide pigment and one or more texturing materials selected from the group consisting of pumice and perlite.

24. A method comprising applying a coating comprising a quick set resin to a metal panel or EIFS.

25. A method comprising applying a coating comprising a quick set resin having a pH based quick set mechanism to a metal panel or EIFS.

26. A method comprising applying a coating comprising Rhoplex EI-3500 to a metal panel.

27. A composition comprising a metal panel with a coating comprising a quick set resin.

28. A composition comprising a metal panel with a coating comprising a quick set resin having a pH based quick set mechanism.

29. A composition comprising a metal panel and a coating comprising Rhoplex EI-3500 to a metal panel.

30. A method comprising applying a coating to a substrate, wherein said coating comprises a heat reflective metal oxide pigment and a quick set resin.

31. A method comprising applying a coating to a substrate, wherein said coating comprises a heat reflective metal oxide pigment and a quick set resin having a pH based quick set mechanism.

32. A method comprising applying a coating to a substrate, wherein said coating comprises a heat reflective metal oxide pigment and Rhoplex EI-3500.

33. A coating composition comprising a heat reflective metal oxide pigment and a quick set resin.

34. A coating composition comprising a heat reflective metal oxide pigment and a quick set resin having a pH based quick set mechanism.

35. A coating composition comprising a heat reflective metal oxide pigment and Rhoplex EI-3500.

36. A textured coating composition comprising a heat reflective metal oxide pigment, a texturing material and a quick set resin.

37. A textured coating composition comprising a heat reflective metal oxide pigment, a texturing material and a quick set resin having a pH based quick set mechanism.

38. A textured coating composition comprising a heat reflective metal oxide pigment, a texturing material and Rhoplex EI-3500.

39. A smooth coating composition comprising a heat reflective metal oxide pigment and a quick set resin.

40. A smooth coating composition comprising a heat reflective metal oxide pigment and a quick set resin having a pH based quick set mechanism.

41. A smooth coating composition comprising a heat reflective metal oxide pigment and Rhoplex EI-3500.

42. A single skin metal panel comprising a textured coating.

43. A single skin metal panel comprising a coating that comprises a texturing material and a heat reflective metal oxide pigment.

44. A composition comprising (1) a substrate (such as a metal substrate, for example a metal substrate for use in marine applications or environments), (2) an optional metal primer (can be a spot primer applied only to corroded areas), (3) an optional acrylic/latex resin such as "Tex-Bond" coating to cover any previously coated substrate, (4) a heat reflective coating as described herein that can optionally be a fluorinated resin system (for example PVDF or FEVE) containing layer, and (5) a polyurethane coating layer (e.g., a two component polyurethane coating layer).

45. A marine coating system composition comprising (1) an optional metal primer (can be a spot primer applied only to corroded areas), (2) an optional acrylic/latex resin such as "Tex-Bond" coating to cover any previously coated substrate, (3) a heat reflective coating as described herein that can optionally be a fluorinated resin system (for example PVDF or FEVE) containing layer, and (4) a polyurethane coating layer (e.g., a two component polyurethane coating layer).

46. A composition comprising (1) a substrate (such as a metal substrate, for example a metal substrate for use in marine applications or environments), (2) an optional metal primer (can be a spot primer applied only to corroded areas), (3) an optional acrylic/latex resin such as "Tex-Bond" coating to cover any previously coated substrate, (4) a heat reflective metal oxide pigment coating as described herein that is a polyurethane coating layer (e.g., a two component polyurethane coating layer) that may optionally include a fluorinated resin system (for example PVDF or FEVE).

47. A marine coating composition system comprising, (1) an optional metal primer (can be a spot primer applied only to corroded areas), (2) an optional acrylic/latex resin such as "Tex-Bond" coating to cover any previously coated substrate, (3) a heat reflective metal oxide pigment coating as described herein that is a polyurethane coating layer (e.g., a two component polyurethane coating layer) that may optionally include a fluorinated resin system (for example PVDF or FEVE).

48. A non-slip composition comprising, (1) a walking surface substrate (such as a deck, etc.), (2) an optional primer or bonding layer (for example an acrylic/latex resin such as "Tex-Bond"), (3) a textured coating layer such as described herein, and (4) an optional polyurethane layer as described herein; wherein—a heat reflective metal oxide pigments is present in one or more of the (2)-(4) layers.

49. A non-slip coating composition comprising, (1) an optional primer or bonding layer (for example an acrylic/latex resin such as "Tex-Bond"), (2) a textured coating layer such as described herein, and (3) an optional polyurethane layer as described herein; wherein—a heat reflective metal oxide pigments is present in one or more of the (1)-(3) layers.

50. A non-slip composition comprising, (1) a walking surface substrate (such as a deck, etc.), (2) an optional primer or bonding layer (for example an acrylic/latex resin such as "Tex-Bond"), (3) a primary layer (such as an acrylic layer, for example a layer of REFLECT-TEC™), (4) a texturing material sprinkled on the primary layer, (5) a secondary layer (such as an acrylic layer, for example a layer of REFLECT-TEC™) coated over the primary layer and the texturing material, and (9) an optional polyurethane top coat layer as described herein; wherein pigments to create the desired color may be present in either or both of the primary and secondary layers and heat reflective metal oxide pigments may be present in either or both of the primary and secondary layers.

51. A heat reflective metal oxide coating comprising a heat reflective metal oxide pigment and an acrylic/latex resin (optionally a quick set resin).

52. A heat reflective metal oxide coating comprising a heat reflective metal oxide pigment, an acrylic/latex resin (optionally a quick set resin) and a fluorinated resin system (for example PVDF or FEVE).

53. A composition comprising a concrete or clay substrate and a heat reflective metal oxide coating comprising a heat reflective metal oxide pigment and an acrylic/latex resin (optionally a quick set resin).

54. A composition comprising a concrete or clay substrate and a heat reflective metal oxide coating comprising a heat reflective metal oxide pigment, an acrylic/latex resin (optionally a quick set resin) and a fluorinated resin system (for example PVDF or FEVE).

55. A composition comprising a concrete or clay substrate and a heat reflective metal oxide coating comprising a heat reflective metal oxide pigment and an acrylic/latex resin (optionally a quick set resin); wherein said concrete or clay substrate is wet (unhardened).

56. A composition comprising a concrete or clay substrate and a heat reflective metal oxide coating comprising a heat reflective metal oxide pigment, an acrylic/latex resin (optionally a quick set resin) and a fluorinated resin system (for example PVDF or FEVE); wherein said concrete or clay substrate is wet (unhardened).

57. A method of applying a heat reflective coating to a concrete or clay substrate, said method comprising spray applying a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE).

58. A method of applying a heat reflective coating to a concrete or clay substrate, said method comprising spray applying a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE); and wherein said heat reflective coating is applied while said concrete or clay substrate is wet (unhardened).

59. A method of applying a heat reflective coating to a concrete or clay substrate, said method comprising: (1) preparing said concrete or clay substrate, (2) after said concrete or clay substrate dries or hardens spray applying a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE).

60. A method of applying a heat reflective coating to a concrete or clay substrate, said method comprising: (1) preparing said concrete or clay substrate and heating said concrete or clay substrate to dry/cure/harden it, (2) after said concrete or clay substrate dries or hardens spray applying a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE; wherein said heat reflective coating is applied within one minute after said concrete or clay tile is removed from the heat to dry/cure/harden it.

61. A method of applying a heat reflective coating to a concrete or clay substrate, said method comprising: (1) preparing said concrete or clay substrate and heating said concrete or clay substrate to dry/cure/harden it, (2) after said concrete or clay substrate dries or hardens spray applying a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE; wherein said heat reflective coating is applied within while said concrete or clay tile is at a temperature of about 100 degrees Fahrenheit or higher.

62. A method of applying a heat reflective coating to a concrete or clay substrate, said method comprising: (1) preparing said concrete or clay substrate, (2) before said concrete or clay substrate dries or hardens spray applying a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE); and (3) allowing said concrete or clay substrate and said coating to dry (harden).

63. A method of applying a heat reflective coating to a concrete or clay substrate, said method comprising: (1) preparing said concrete or clay substrate, (2) before said concrete or clay substrate dries or hardens spray applying a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE); and (3) heating said concrete or clay substrate and said coating.

64. A method of applying a heat reflective coating to a concrete or clay substrate, said method comprising: (1) preparing said concrete or clay substrate, (2) before said concrete or clay substrate dries or hardens spray applying a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE); and (3) heating said concrete or clay substrate and said coating until said concrete or clay substrate and said coating dry (harden).

65. A method of applying a heat reflective coating to a concrete or clay substrate, said method comprising: (1) preparing said concrete or clay substrate, (2) before said concrete or clay substrate dries or hardens spray applying a first coat of a heat reflective coating to the surface of said concrete or clay substrate; wherein said heat reflective coating comprises a heat reflective metal oxide pigment, an acrylic/latex resin (optionally a quick set resin) and optionally a fluorinated resin system (for example PVDF or FEVE); (3) heating said concrete or clay substrate and said coating until said concrete or clay substrate and said coating dry (harden); applying a second coat of a heat reflective coating to the surface of said concrete or clay substrate; wherein said second coat of said heat reflective coating comprises a heat reflective metal oxide pigment, an acrylic/latex resin (optionally a quick set resin) and optionally a fluorinated resin system (for example PVDF or FEVE).

66. The method or composition of any of the preceding embodiments wherein the coating having a heat reflective metal oxide pigment is applied to a substrate at a thickness of at least 13 mils dry film thickness.

67. The method or composition of any of the preceding embodiments wherein the coating having a heat reflective metal oxide pigment is applied to a substrate at a thickness of at least 14 mils dry film thickness.

68. The method or composition of any of the preceding embodiments wherein the coating having a heat reflective metal oxide pigment is applied to a substrate at a thickness of at least 15 mils dry film thickness.

69. The method or composition of any of the preceding embodiments wherein the coating having a heat reflective metal oxide pigment is applied to a substrate at a thickness of at least 16 mils dry film thickness.

70. The method or composition of any of the preceding embodiments wherein the coating having a heat reflective metal oxide pigment is applied to a substrate at a thickness of at least 17 mils dry film thickness.

71. The method or composition of any of the preceding embodiments wherein the coating having a heat reflective metal oxide pigment is applied to a substrate at a thickness of 12-20 mils dry film thickness.

72. The method or composition of any of the preceding embodiments wherein the coating having a heat reflective metal oxide pigment is a smooth coating and is applied to a substrate at a thickness of 12-20 mils dry film thickness.

73. The method or composition of any of the preceding embodiments wherein the coating having a heat reflective metal oxide pigment is a textured coating and is applied to a substrate at a thickness of 15-20 mils dry film thickness.

74. The method or composition of any of the preceding embodiments wherein the coating having a heat reflective metal oxide pigment is a textured coating and is applied to a substrate at a thickness of 16-20 mils dry film thickness.

75. The method or composition of any of the preceding embodiments wherein the coating having a heat reflective metal oxide pigment is a textured coating and is applied to a substrate at a thickness of 10-35 mils dry film thickness.

76. The method or composition of any of the preceding embodiments wherein the coating having a heat reflective metal oxide pigment is a textured coating and is applied to a substrate at a thickness of 10-12 mils dry film thickness.

77. The method or composition of any of the preceding embodiments wherein the coating having a heat reflective metal oxide pigment is a textured coating and is applied to a substrate at a thickness of 13-16 mils dry film thickness.

78. The method or composition of any of the preceding embodiments wherein the coating having a heat reflective metal oxide pigment is a textured coating and is applied to a substrate at a thickness of 20-35 mils dry film thickness.

79. The method or composition of any of the preceding embodiments wherein the coating having a heat reflective metal oxide pigment is a textured coating and is applied to a substrate at a thickness of 25-35 mils dry film thickness.

80. The method or composition of any of the preceding embodiments wherein the coating having a heat reflective metal oxide pigment is a textured coating and is applied to a substrate at a thickness of 30-35 mils dry film thickness.

81. The method or composition of any of the preceding embodiments; wherein the coating having a heat reflective metal oxide pigment is applied to the substrate without any white or near white primer.

82. The method of embodiment 1, wherein said heat reflective wall paint comprises titanium dioxide.

83. The method or composition of any of the preceding embodiments, wherein the coating comprises titanium dioxide.

84. The method or composition of any of the preceding embodiments, wherein the heat reflective metal oxide pigment, if present, comprises pigment having a corundum-hematite crystal lattice structure.

85. The method or composition of any of the preceding embodiments, wherein the heat reflective metal oxide pigment, if present, comprises a pigment having a spinel crystal lattice structure.

86. The method or composition of any of the preceding embodiments, wherein the heat reflective metal oxide pigment, if present, comprises pigment having a nickel titanate rutile structure.

87. The method or composition of any of the preceding embodiments, wherein said heat reflective metal oxide pigment, if present, is an oxide of a metal selected from the group consisting of aluminum, antimony, bismuth, boron, chrome, cobalt, gallium, indium, iron, lanthanum, lithium, magnesium, manganese, molybdenum, neodymium, nickel, niobium, silium, tin, vanadium, and zinc.

88. The method or composition of any of the preceding embodiments, wherein the coated substrate reflects light of infrared wavelengths.

89. The method or composition of any of the preceding embodiments, wherein the coated substrate reflects infrared light of wavelength ranging from 750 to 2500 nm.

90. The method or composition of any of the preceding embodiments, wherein the coated substrate reflects infrared light of wavelength ranging from 800 to 2450 nm.

91. The method or composition of any of the preceding embodiments, wherein the coated substrate reflects infrared light of wavelength ranging from 900 to 2400 nm.

92. The method or composition of any of the preceding embodiments, wherein the coated substrate reflects infrared light of wavelength ranging from 1000 to 2300 nm.

93. The method or composition of any of the preceding embodiments, wherein the coated substrate reflects infrared light of wavelength ranging from 1500 to 2000 nm.

94. The method or composition of any of the preceding embodiments, wherein the coated substrate reflects infrared light of wavelength ranging from 1500 to 2000 nm.

95. The method or composition of any of the preceding embodiments, wherein the coated substrate exhibits an infrared reflectance above 30%.

96. The method or composition of any of the preceding embodiments, wherein the coated substrate exhibits an infrared reflectance above 70%.

97. The method or composition of any of the preceding embodiments, where in the coating having a heat reflective metal oxide pigment, if present, is not white.

98. The method or composition of any of the preceding embodiments, where in the coating having a heat reflective metal oxide pigment, if present, is a dark color.

99. The method or composition of any of the preceding embodiments, where in the coating having a heat reflective metal oxide pigment, if present, is black, blue, green, yellow, red or any combination thereof.

100. The method or composition of any of the preceding embodiments, wherein the coating has a heat reflective metal oxide pigment a concentration between about 0.1-12% by weight.

101. The method or composition of any of the preceding embodiments, wherein the coating has a heat reflective metal oxide pigment a concentration between about 0.1-6% by weight.

102. The method or composition of any of the preceding embodiments, wherein the coating has a heat reflective metal oxide pigment a concentration between about 0.1-5% by weight.

103. The method or composition of any of the preceding embodiments, wherein the coating has a heat reflective metal oxide pigment a concentration between about 3-6% by weight.

104. The method or composition of any of the preceding embodiments, wherein the coating has a heat reflective metal oxide pigment a concentration between about 5-7% by weight.

105. The method or composition of any of the preceding embodiments, wherein the coating has a heat reflective metal oxide pigment a concentration between about 7-12% by weight.

106. The method or composition of any of the preceding embodiments, wherein the coating has a heat reflective metal oxide pigment a concentration between about 8-12% by weight.

107. The method or composition of any of the preceding embodiments, wherein the coating is applied at a thickness of about 5 mils dry film thickness and has a heat reflective metal oxide pigment a concentration between about 0.1-6% by weight.

108. The method or composition of any of the preceding embodiments, wherein the coating is applied at a thickness of about 10 mils dry film thickness and has a heat reflective metal oxide pigment a concentration between about 0.1-6% by weight.

109. The method or composition of any of the preceding embodiments, wherein the coating comprises a texturing material having particles that are between about 20-500 microns.

110. The method or composition of any of the preceding embodiments, wherein the coating comprises a texturing material having particles that are between about 20-300 microns.

111. The method or composition of any of the preceding embodiments, wherein the coating comprises a texturing material having particles that are between about 50-400 microns.

112. The method or composition of any of the preceding embodiments, wherein the coating comprises a texturing material having particles that are between about 100-500 microns.

113. The method or composition of any of the preceding embodiments, wherein the coating comprises a texturing material having particles that are between about 200-400 microns.

114. The method or composition of any of the preceding embodiments, wherein the coating comprises a texturing material having particles that are about 20-2000 microns.

115. The method or composition of any of the preceding embodiments, wherein the coating comprises a texturing material having particles that are about 500-2000 microns.

116. The method or composition of any of the preceding embodiments, wherein the coating comprises a texturing material having particles that are about 700-2000 microns.

117. The method or composition of any of the preceding embodiments, wherein the coating comprises a texturing material having particles that are about 1,000-2000 microns.

118. The method or composition of any of the preceding embodiments, wherein the coating comprises a texturing material having particles that are about 1,500-2,000 microns.

119. The method or composition of any of the preceding embodiments, wherein the coating comprises a texturing material having particles that are about 1,200-1,700 microns.

120. The method or composition of any of the preceding embodiments wherein the coating comprises a texturing material in a concentration of at least 4% by weight.

121. The method or composition of any of the preceding embodiments wherein the coating comprises a texturing material in a concentration of at least 8% by weight.

122. The method or composition of any of the preceding embodiments wherein the coating comprises a texturing material in a concentration of at least 15% by weight.

123. The method or composition of any of the preceding embodiments wherein the coating comprises a texturing material in a concentration of at least 25% by weight.

124. The method or composition of any of the preceding embodiments wherein the coating comprises a texturing material in a concentration of at least 40% by weight.

125. The method or composition of any of the preceding embodiments wherein the coating comprises a texturing material in a concentration of at about 4-60% by weight.

126. The method or composition of any of the preceding embodiments wherein the coating comprises a texturing material in a concentration of at least 10-50% by weight.

127. The method or composition of any of the preceding embodiments, wherein if the coating having a heat reflective metal oxide pigment is a textured coating it is textured to resemble concrete.

128. The method or composition of any of the preceding embodiments, wherein if the coating having a heat reflective 128. (continued) metal oxide pigment is a textured coating it is textured to resemble concrete and comprises ground limestone or similar texturing material with particle sizes of about 600-1,700 microns and extender pigments such as calcium carbonate.

129. The method or composition of any of the preceding embodiments, wherein if the coating having a heat reflective metal oxide pigment is a textured coating it is textured to resemble concrete and comprises ground limestone or similar texturing material with particle sizes of about 600-1,700 microns and extender pigments such as calcium carbonate; wherein the textured coating has a semi-course matte finish.

130. The method or composition of any of the preceding embodiments, wherein if the coating having a heat reflective metal oxide pigment is a textured coating it is textured to resemble concrete and comprises ground limestone or similar texturing material with particle sizes of about 600-1,700 microns and extender pigments such as calcium carbonate; wherein the textured coating has a semi-course matte finish; and wherein the textured coating is applied at about 15-35 mils dry film thickness.

131. The method or composition of any of the preceding embodiments, wherein if the coating having a heat reflective metal oxide pigment is a textured coating it is textured to resemble stucco.

132. The method or composition of any of the preceding embodiments, wherein if the coating having a heat reflective metal oxide pigment is a textured coating it is textured to resemble stucco and comprises pumice having particle sizes of about 300-600 microns and/or perlite having particle sizes of about 150-400 microns and extender pigments such as calcium carbonate.

133. The method or composition of any of the preceding embodiments, wherein if the coating having a heat reflective metal oxide pigment is a textured coating it is textured to resemble stucco and comprises pumice having particle sizes of about 300-600 microns and/or perlite having particle sizes of about 150-400 microns and extender pigments such as calcium carbonate; wherein the textured coating has a semi-course matte finish.

134. The method or composition of any of the preceding embodiments, wherein if the coating having a heat reflective metal oxide pigment is a textured coating it is textured to resemble stucco and comprises pumice having particle sizes of about 300-600 microns and/or perlite having particle sizes of about 150-400 microns and extender pigments such as calcium carbonate; wherein the textured coating has a semi-course matte finish; and wherein the textured coating is applied at about 10-18 mils dry film thickness.

135. A composition comprising a metal panel, EIFS or a stucco bottom coat with a heat reflective coating on the surface; wherein said coating is about 10-35 mils dry film thickness and comprises a heat reflective metal oxide pigment at a concentration between 0.1-12% by weight of the coating.

136. A composition comprising a metal panel, EIFS or a stucco bottom coat with a heat reflective coating on the surface; wherein said coating is about 11-35 mils dry film thickness and comprises a heat reflective metal oxide pigment at a concentration between 0.1-6% by weight of the coating.

137. A composition comprising a metal panel, EIFS or a stucco bottom coat with a heat reflective coating on the surface; wherein said coating is about 11-35 mils dry film thickness and comprises a heat reflective metal oxide pigment at a concentration between 0.1-6% by weight of the coating, and a quick set resin.

138. A composition comprising a metal panel, EIFS or a stucco bottom coat with a textured coating on the surface; wherein the wherein the textured coating is about 10-35 mils dry film thickness, comprises a heat reflective metal oxide pigment at a concentration between 0.1-12% by weight of the textured coating, and comprises a texturing material having particle sizes of about 20-2000 microns in a concentration of about 4-60% by weight of the textured coating.

139. A composition comprising a metal panel, EIFS or a stucco bottom coat with a textured coating on the surface; wherein the wherein the textured coating is about 11-35 mils dry film thickness, comprises a heat reflective metal oxide pigment at a concentration between 0.1-6% by weight of the textured coating, and comprises a texturing material having particle sizes of about 20-1,500 microns in a concentration of about 4-60% by weight of the textured coating.

140. A composition comprising a metal panel, EIFS or a stucco bottom coat with a textured coating on the surface; wherein the wherein the textured coating is about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating.

141. A composition comprising a metal panel, EIFS or a stucco bottom coat with a textured coating on the surface; wherein the wherein the textured coating is about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating; wherein the texturing material is one or more selected from the group consisting of pumice and perlite.

142. A method comprising spraying a heat reflective coating onto the surface of a metal panel, EIFS or a stucco bottom coat; wherein said coating is applied at about 10-35 mils dry film thickness and comprises a heat reflective metal oxide pigment at a concentration between 0.1-12% by weight of the coating.

143. A method comprising spraying a textured coating onto the surface of a metal panel, EIFS or a stucco bottom coat; wherein the wherein the textured coating is applied at about 11-35 mils dry film thickness, comprises a texturing material having particle sizes of about 20-600 microns in a concentration of about 4-20% by weight of the textured coating; wherein the texturing material is one or more selected from the group consisting of pumice and perlite; and wherein the coating is applied in an automated manner.

144. A method comprising spraying a textured coating onto the surface of a metal panel, EIFS or a stucco bottom coat; wherein the wherein the textured coating is applied at about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating; wherein the texturing material is one or more selected from the group consisting of pumice and perlite; and wherein the coating is applied in an automated manner.

145. A method comprising spraying a textured coating onto the surface of a metal panel, EIFS or a stucco bottom coat; wherein the wherein the textured coating is applied at about 11-35 mils dry film thickness, comprises a heat reflective metal oxide pigment at a concentration between 0.1-6% by weight of the textured coating, and comprises a texturing material having particle sizes of about 20-600 microns in a concentration of about 4-20% by weight of the textured coating; wherein the texturing material is one or more selected from the group consisting of pumice and perlite; and wherein the coating is applied in an automated manner using the following equipment 1.) ¾" fluid hose 2.) Pressure pot capable of producing 70 PSI, and Graco 204-000 texture gun supplied with 30 PSI air and ⅛" "Buck Rogers" style tip.

146. A textured coating comprising pumice particles greater than about 150 microns.

147. A textured coating comprising pumice particles greater than about 150 microns and heat reflective metal oxide pigments.

148. The method or composition of any of the preceding embodiments, wherein the coating comprises pumice.

149. The method or composition of any of the preceding embodiments, wherein the coating comprises pumice having particle sizes of at least about 150 microns.

150. The method or composition of any of the preceding embodiments, wherein the coating comprises pumice having particle sizes of at least about 150 microns.

151. The method or composition of any of the preceding embodiments, wherein the coating comprises at least about 7% by wet weight pumice texturing materials having particle sizes of at least about 150 microns.

152. The method or composition of any of the preceding embodiments, wherein the coating comprises at least about 7% by wet weight pumice texturing materials having particle sizes of at least about 150 microns.

153. The method or composition of any of the preceding embodiments, wherein the coating comprises at least about 7% by wet weight pumice texturing materials having particle sizes of at least about 175 microns.

154. The method or composition of any of the preceding embodiments, wherein the coating comprises at least about 7% by wet weight pumice texturing materials having particle sizes of at least about 200 microns.

155. The method or composition of any of the preceding embodiments, wherein the coating comprises at least about 7% by wet weight pumice texturing materials having particle sizes of at least about 250 microns.

156. The method or composition of any of the preceding embodiments, wherein the coating comprises at least about 7% by wet weight pumice texturing materials having particle sizes of at least about 300 microns.

157. The method or composition of any of the preceding embodiments, wherein the coating comprises at least about 7% by wet weight pumice texturing materials having particle sizes of at least about 350 microns.

158. The method or composition of any of the preceding embodiments, wherein the coating comprises at least about 7% by wet weight pumice texturing materials having particle sizes of at least about 400 microns.

159. The method or composition of any of the preceding embodiments, wherein the coating comprises at least about 7% by wet weight pumice texturing materials having particle sizes of at least about 500 microns.

160. The method or composition of any of the preceding embodiments, wherein the coating comprises at least about 7% by wet weight pumice texturing materials having particle sizes of at least about 600 microns.

161. The method or composition of any of the preceding embodiments, wherein the coating comprises at least about 7% by wet weight pumice texturing materials having particle sizes of at least about 800 microns.

162. The method or composition of any of the preceding embodiments, wherein the coating comprises at least about 10% by wet weight pumice texturing materials having particle sizes of at least about 150 microns.

163. The method or composition of any of the preceding embodiments, wherein the coating comprises at least about 10% by wet weight pumice texturing materials having particle sizes of at least about 150 microns.

164. The method or composition of any of the preceding embodiments, wherein the coating comprises at least about 10% by wet weight pumice texturing materials having particle sizes of at least about 175 microns.

165. The method or composition of any of the preceding embodiments, wherein the coating comprises at least about 10% by wet weight pumice texturing materials having particle sizes of at least about 200 microns.

166. The method or composition of any of the preceding embodiments, wherein the coating comprises at least about 10% by wet weight pumice texturing materials having particle sizes of at least about 250 microns.

167. The method or composition of any of the preceding embodiments, wherein the coating comprises at least about 10% by wet weight pumice texturing materials having particle sizes of at least about 300 microns.

168. The method or composition of any of the preceding embodiments, wherein the coating comprises at least about 10% by wet weight pumice texturing materials having particle sizes of at least about 350 microns.

169. The method or composition of any of the preceding embodiments, wherein the coating comprises at least about 10% by wet weight pumice texturing materials having particle sizes of at least about 400 microns.

170. The method or composition of any of the preceding embodiments, wherein the coating comprises at least about 10% by wet weight pumice texturing materials having particle sizes of at least about 500 microns.

171. The method or composition of any of the preceding embodiments, wherein the coating comprises at least about 10% by wet weight pumice texturing materials having particle sizes of at least about 600 microns.

172. The method or composition of any of the preceding embodiments, wherein the coating comprises at least about 10% by wet weight pumice texturing materials having particle sizes of at least about 800 microns.

173. The method or composition of any of the preceding embodiments, wherein the coating comprises at least about 12% by wet weight pumice texturing materials having particle sizes of at least about 150 microns.

174. The method or composition of any of the preceding embodiments, wherein the coating comprises at least about 12% by wet weight pumice texturing materials having particle sizes of at least about 175 microns.

175. The method or composition of any of the preceding embodiments, wherein the coating comprises at least about 12% by wet weight pumice texturing materials having particle sizes of at least about 200 microns.

176. The method or composition of any of the preceding embodiments, wherein the coating comprises at least about 12% by wet weight pumice texturing materials having particle sizes of at least about 250 microns.

177. The method or composition of any of the preceding embodiments, wherein the coating comprises at least about 12% by wet weight pumice texturing materials having particle sizes of at least about 300 microns.

178. The method or composition of any of the preceding embodiments, wherein the coating comprises at least about 12% by wet weight pumice texturing materials having particle sizes of at least about 350 microns.

179. The method or composition of any of the preceding embodiments, wherein the coating comprises at least about 12% by wet weight pumice texturing materials having particle sizes of at least about 400 microns.

180. The method or composition of any of the preceding embodiments, wherein the coating comprises at least about 12% by wet weight pumice texturing materials having particle sizes of at least about 500 microns.

181. The method or composition of any of the preceding embodiments, wherein the coating comprises at least about 12% by wet weight pumice texturing materials having particle sizes of at least about 600 microns.

182. The method or composition of any of the preceding embodiments, wherein the coating comprises at least about 12% by wet weight pumice texturing materials having particle sizes of at least about 800 microns.

183. The method or composition of any of the preceding embodiments, wherein the coating does not include abrasive texturing materials.

184. The method or composition of any of the preceding embodiments, wherein the coating is a textured coating and wherein abrasive texturing materials are present in the coating in an amount less than 10% wet weight.

185. The method or composition of any of the preceding embodiments, wherein the coating is a textured coating and wherein abrasive texturing materials are present in the coating in an amount less than 8% wet weight.

186. The method or composition of any of the preceding embodiments, wherein the coating is a textured coating and wherein abrasive texturing materials are present in the coating in an amount less than 6% wet weight.

187. The method or composition of any of the preceding embodiments, wherein the coating is a textured coating and wherein abrasive texturing materials are present in the coating in an amount less than 4% wet weight.

188. The method or composition of any of the preceding embodiments, wherein the coating is a textured coating and wherein abrasive texturing materials are present in the coating in an amount less than 2% wet weight.

189. The method or composition of any of the preceding embodiments, wherein the coating is a textured coating and wherein abrasive texturing materials are present in the coating in an amount less than 1% wet weight.

The following examples are provided to further illustrate aspects of the invention. These examples are non-limiting and should not be construed as limiting any aspect of the invention.

EXAMPLE 1

Preparation of TEX-COTE® REFLECT-TEX™ Heat Reflective Metal Coating

The REFLECT-TEX™ Textured Metal Coating was prepared as a 100% acrylic coating having approximately 50% solids by weight, 46% solids by volume. The REFLECT-TEX™ contains about 1-2% organic solvent, and 34-35% weight percent pigment (pigments include metal oxide pigments, titanium dioxide, and fillers such as formed silica, titanium extenders, clay, and texture aggregates). The density of REFLECT-TEX™ is 10.1 pounds per gallon, and the pigment volume content is about 50 percent on average.

Titanium levels were adjusted depending upon the final desired color to be achieved. The solids content was kept approximately the same in all REFLECT-TEX™ formulations by using inert fillers. Titanium levels varied from none to approximately 5% by weight. Viscosity adjustments were made by adjustment with HEUR viscosity modifiers.

Various colored REFLECT-TEX™ formulations were achieved by combining the above described base coat with approximately 0.1 to 6 percent of metal oxide pigment(s).

For a light, off white color (i.e. Almond), the following formulation, by weight, was mixed together:

| | |
|---|---|
| Base coat (3.5% titanium) | 99.66% |
| High IR Red Iron Oxide | 0.1% |
| Nickel Antimony Titanium Buff Rutile | 0.2% |
| Modified Hematite | 0.04% |

For a medium (i.e. Tan) color, the following formulation, by weight, was mixed together:

| | |
|---|---|
| Base coat (3.5% titanium) | 98.2% |
| High IR Red Iron Oxide | 0.1% |
| Chrome Antimony Titanium Buff Rutile | 0.5% |
| Modified Hematite | 0.2% |

For a dark gray color (i.e. Gray) the following formulation, by weight, was mixed together:

| | |
|---|---|
| Base Coat (3.5% titanium) | 96.41% |
| High IR Red Iron Oxide | 0.2% |
| Chrome Antimony Titanium Buff Rutile | .21% |
| Modified Hematite | 3.18% |

EXAMPLE 2

Effectiveness of Thick Heat Reflective Coatings with and without White Primers

Textured metal coatings for exterior surfaces have been developed utilizing complex mixed metal oxide pigments that reflect solar energy in the near infrared range. This example demonstrates that thick film coatings are have reflective performance equal to thinner film coatings which must be applied over a white primer in order to generate the highest possible total solar reflectance (TSR).

The experimental textured coating was produced and tinted to a light, medium, and dark color using mixed metal oxide dispersions of the corundum hematite, spinal, and rutile structures. The colorimetric CIE data for the three colors is listed in Table 1.

TABLE 1

| Color | *L | *a | *b |
|---|---|---|---|
| Gray | 58.19 | 0.15 | 1.08 |
| Tan | 58.49 | 3.47 | 12.20 |
| Almond | 76.39 | 0.04 | 12.06 |

3"×6" aluminum Q panels were coated with either a titanium dioxide white primer or a carbon black primer. The primers were allowed to cure, and then the textured coating was applied at a wet film thickness between about 12 and 20 mils (dry film thickness between about 6 and 10 mils) over both the black and white primed panels. The coating was allowed to cure 24 hours before testing commenced.

Temperature data comparing the textured coatings over the black or white primer was generated using a modified version of ASTM D4803-97 (Standard Test Method for Predicting Heat Buildup of Exterior Objects). The test apparatus uses a platform designed to hold two adjacent 3"×6" coated metal panels face up. A 250 watt infrared heat lamp is secured 12"above the panels and allowed to radiate heat for 20 minutes prior to reading the surface temperature of the coated panels. Temperatures were taken at various sections of the panel using a laser non-contact thermometer. Panels with only black primer and white primer were used as controls. Listed in Table 2 are the surface temperature results.

TABLE 2

| Color Tested | Surface Temp/Black Primer | Surface Temp/White Primer |
|---|---|---|
| Black Primer Control | 190° F. | N/A |
| White Primer Control | N/A | 118° F. |
| Gray | 153° F. | 153° F. |
| Tan | 147° F. | 147° F. |
| Almond | 141° F. | 142° F. |

Solar reflectance values were generated for the three colors over black and over white. Each of the three colors were compared against a non-IR control at both 6 mils and 30 mils wet (about 3 and 15 mils dry, respectively). Total Solar Reflectance (TSR) values were generated by an outside laboratory using a portable Reflectometer. The results are listed in Table 3.

TABLE 3

Total Solar Reflectance for IR 6 mil, 30 mil, and non-IR 6 mil

| | Over White | | | Over Black | | |
|---|---|---|---|---|---|---|
| | Reading #1 | Reading #2 | Reading #3 | Reading #1 | Reading #2 | Reading #3 |
| Almond | | | | | | |
| Non-IR 6 mils | 47.2 | 47.3 | 47.0 | 44.5 | 44.4 | 44.4 |
| IR 6 mils | 63.1 | 63.4 | 63.3 | 56.2 | 56.2 | 56.0 |
| IR 30 mils | 62.8 | 62.6 | 62.7 | 61.3 | 61.9 | 62.0 |
| Tan | | | | | | |
| Non-IR 6 mils | 23.0 | 23.0 | 23.0 | 22.8 | 22.8 | 22.8 |
| IR 6 mils | 47.0 | 47.0 | 47.2 | 41.2 | 41.4 | 41.2 |
| IR 30 mils | 45.8 | 45.8 | 46.0 | 45.5 | 45.5 | 45.6 |
| Gray | | | | | | |
| Non-IR 6 mils | 20.1 | 20.1 | 20.0 | 20.0 | 20.0 | 20.1 |
| IR 6 mils | 44.4 | 44.3 | 44.1 | 38.4 | 38.2 | 38.4 |
| IR 30 mils | 43.2 | 43.2 | 43.3 | 42.8 | 42.7 | 42.6 |

The data generated from this study demonstrates that the thick textured metal coating containing combinations of inorganic mixed metal oxides reflects the same amount of infrared energy whether it is applied over a black or over a white bottom coat.

EXAMPLE 3

Example Pumice and Perlite Mixtures for Use as Non-Abrasive Texturing Materials

The following are exemplary mixtures of Pumice and Perlite that may be used as non-abrasive texturing materials in various embodiments of the compositions and methods disclosed herein:

CR Grade #3 Pumice
Particle Size Distribution: C.R. Minerals Navajo Brand #3 Pumice
Range: 150-595 Microns
Whereas:
99.6% is less than 595 microns
60.8% is less than 420 microns
16.5% is less than 297 microns
4.0% is less than 250 microns
0.7% is less than 177 microns
0.5% is less than 150 microns
CR Grade #3 Plus Pumice
Particle Size Distribution: C.R. Mineral Navajo Brand #3 Plus Pumice
Range: 175 microns-700 microns
Whereas:
55% is less than 595 microns
30% is less than 420 microns
17.5% is less than 297 microns
5% is less than 250 microns
5% is less than 177 microns
CR Grade #4 Pumice
Particle Size Distribution: C.R. Mineral Navajo Brand #4 Pumice
Range: 297 microns-1680 microns
Whereas:
66% is less than 1410 microns
26.8 is less than 841 microns
11% is less than 595 microns
2.7% is less than 420 microns
1% is less than 297 microns
50×50 Grade Perlite
Particle Size Distribution: Harbolite Co. 50×50 Perlite
Range: 150-841 Microns
Whereas:
99.85% is less than 841 microns
45.17% is less than 297 microns
12.35% is less than 177 microns

EXAMPLE 4

Example Formulation of Course Heat-Reflective Textured Metal Coating Resembling Concrete Color: Medium Tan A concrete-look coating is prepared having the following ingredients:

| Ingredient | Weight Percent |
|---|---|
| 1. Water | 12.28% |
| 2. Hydroxyethyl Cellulose | 0.27% |
| 3. Defoamer | 0.57% |
| 4. Dispersant | 0.73% |
| 5. Titanium Dioxide | 2.30% |
| 6. Extender Pigment | 11.62% |
| 7. Cosolvent | 0.94% |
| 8. Acrylic Latex Emulsion | 20.38% |
| 9. Screen Grade Course Limestone | 39.38% |
| 10. Screen Grade Semi-Course Limestone | 9.83% |
| 11. Thickener | 0.70% |
| 12. High IR Red Iron Oxide | 0.1% |
| 13. Chrome Antimony Titanium Buff Rutile | 0.7% |
| 14. Modified Hematite | 0.2% |
| Total | 100.0% |

Details for some of the ingredients or ingredient categories are as follows:

2. Natrosol, Bermocolle, or Methocel
3. Colloid 640, Colloid 643, Foamaster NXZ, or Foamaster VL
4. Tamol 681, Tamol 850, Tamol 731, Tamol 901, Byk 346, KTPP, Tamol 165, or Disperbyk 190
5. Tronox CR-828, Tronox CR-826, Tioxide TR-93, Tioxide TR-90, or Tioxide TR-60
6. Drikilite, Duramite, or Atomite
7. Texanol, Filmer IBT, Butyl Cellosolve, Butyl Carbitol, or Dowanol PPh
8. Rhoplex EI-3500, Rhoplex EI-2000, Rhoplex AC-264, EPS 2705, or Neocryl XK-98
9. Imerys XO White Limestone, or CR Minerals X-10
10. Imerys 3050 White Limestone, or CR Minerals AS-35
11. Acrysol TT-615, Acrysol TT-963, Acrysol DR-6600, Acrysol SCT-275, or Acrysol 2020 NPR The coating is applied to an architectural metal panel is applied at spread rates of 25-45 square feet per gallon or 35-65 mils wet (about 17-33 mils dry) using an air assisted hopper gun, Graco 1030, Graco 2030 so that the aggregates are evenly distributed across the surface of the substrate. The coating has a course textured, matte finish and has a look resembling concrete.

EXAMPLE 5

Example Formulation of Medium Fine Heat-Reflective Textured Metal Coating Resembling Stucco (Color: Dark Grey)

A concrete-look coating is prepared having the following ingredients:

| Ingredient | Weight Percent |
| --- | --- |
| 1. Water | 15.31% |
| 2. Hydroxyethyl Cellulose | 0.65% |
| 3. Defoamer | 0.88% |
| 4. Dispersant | 1.15% |
| 5. Titanium Dioxide | 2.82% |
| 6. Extender Pigment | 18.89% |
| 7. Cosolvent | 1.66% |
| 8. Acrylic Latex Emulsion | 41.43% |
| 9. Perlite | 5.15% |
| 10. Pumice | 7.46% |
| 11. Biocide | 1.02% |
| 12. High IR Red Iron Oxide | 0.2% |
| 13. Chrome Antimony Titanium Buff Rutile | 0.21% |
| 14. Modified Hematite | 3.18% |
| Total | 100.0% |

Details for some of the ingredients or ingredient categories are as follows:
2. Natrosol, Bermocolle, or Methocel
3. Colloid 640, Colloid 643, Foamaster NXZ, or Foamaster VL
4. Tamol 681, Tamol 850, Tamol 731, Tamol 901, Byk 346, KTPP, Tamol 165, or Disperbyk 190
5. Tronox CR-828, Tronox CR-826, Tioxide TR-93, Tioxide TR-90, or Tioxide TR-60
6. Drikilite, Duramite, or Atomite
7. Texanol, Filmer IBT, Butyl Cellosolve, Butyl Carbitol, or Dowanol PPh
8. Rhoplex EI-3500, Rhoplex EI-2000, Rhoplex AC-264, EPS 2705, or Neocryl XK-98
9. Perlite 50×50 Grade Harborlite
10. Pumice #3 or #4 Screen Grade CR Minerals
11. Polyphase 663, Rocima 200, Rocima 63, Polyphase AF-1, or Acticide GA This example of a coating resembling the look of stucco contains both pumice ranging in particle sizes from 300-600 microns and Perlite ranging in particle sizes from 150-400 microns along with extender pigments such as calcium carbonate to achieve a semi-course textured, matte finish. This coating is applied at spread rates of 45-70 square feet per gallon or 23-35 mils wet (about 11-18 mils dry). This coating can be applied using either a hopper gun, or texture gun such as Graco 1030, Graco 2030, or Graco 204-000 so that the texture aggregates are evenly distributed across the surface of the substrate. The finished coating has a look resembling stucco. The coating may be applied to a substrate such as a metal panel or EIFS or applied as a stucco topcoat.

EXAMPLE 6

Automated Application of Textured Coating

The Stucco type coating of Example 5 which contains both Perlite and Pumice sprayed in an automated fashion to a metal panel using a pressure pot system and an automated version of a Graco 204-000 texture gun. The following equipment is used to effectively spray this coating: 1.) ¾" fluid hose 2.) Pressure pot capable of producing 70 PSI, and Graco 204-000 texture gun supplied with 30 PSI air and ⅛" "Buck Rogers" style tip.

EXAMPLE 7

Insulating Properties of Heat Reflective Coatings Applied on IFIS

This example demonstrates that heat reflective coatings as described herein further increase the insulating properties of EIFS as compared to EIFS with non-heat reflective coatings.

A textured coating was produced and tinted to a medium tan color to match the commercial EIFS coating using mixed metal oxide dispersions of the corundum hematite, spinal, and rutile structures. The colorimetric CIE data for the two coatings of same color space displaying a DE=0.25 is listed in Table 4.

TABLE 4

| Product | *L | *a | *b |
| --- | --- | --- | --- |
| Commercial EIFS Coating | 58.85 | 3.24 | 14.06 |
| TEX-COTE Heat Reflective EIFS Coating | 58.74 | 3.10 | 13.88 |

1 foot square EIFS panels were obtained which were composed of the following components: 1" polystyrene insulation board, polymer based reinforcing mesh, which is then skim coated with a white acrylic base coat. The commercial EIFS coating was applied by trowel between 28 mils-32 mils wet so that even textured finish was observed. The TEX-COTE heat reflective coating was applied in the same manner achieving wet film thickness of 28-32 mils. Both panels were allowed to cure for 72 hours prior to testing.

Temperature data comparing the textured coatings over EIFS was generated using a modified version of ASTM D4803-97 (Standard Test Method for Predicting Heat Buildup of Exterior Objects). The test apparatus uses a platform designed to hold two adjacent 3"×6" coated metal panels face up. A chamber exists below each panel which has temperature sensor attached to a digital display, registering the air temperature inside of each chamber. Both chambers are separated by a plastic acrylic divider measuring approximately 1.2 cm in width. A 250 watt infrared heat lamp was secured approximately 12"above the panels which radiates heat for a period of time prior to reading the surface temperature of the coatings using non-contact laser thermometer. The EIFS coated panels were cut to size and notched so that approximately 2 cm of polystyrene insulation board was recessed into the chamber and an air tight seal was achieved.

Both initial coating surface temperatures and chamber air temperatures were recorded. These two variables were monitored at 15 and 30 minute intervals where temperatures were recorded. This data is listed in Table 5.

Table 5 provides the results of the infrared heat lamp experiments:

TABLE 5

| Time | Commercial EIFS Coating (° F.) | | Tex-Cote HR EIFS Coating (° F.) | |
|---|---|---|---|---|
| | Chamber Temp | Coating Temp | Chamber Temp | Coating Temp |
| Start | 70.1 | 74 | 70.4 | 74 |
| 30 min | 79 | 196 | 75.2 | 155.4 |
| 45 min | 82.6 | 196.3 | 78.3 | 158.6 |
| 1 Hour | 88.7 | 196.9 | 84.2 | 156.2 |
| 1 Hour 15 min | 91.4 | 196.1 | 86.9 | 157.5 |

As can be seen in Table 45 upon exposure to the heat lamp, the surface temperature of the EIFS coated with infrared heat reflective coating as described herein is substantially lower than EIFS not having heat resistant coatings at each time point. Moreover, the chamber temperature was also lower in the heat reflective coating treated EIFS than non treated EIFS; demonstrating a reduction in the rate of heat flow through the polystyrene insulation board. Thus this data demonstrates that the heat reflective coatings as described herein surprisingly increase the heat insulating properties of EIFS beyond the insulating properties of the EIFS alone.

EXAMPLE 8

Example Formulation of Stucco Coating for Spray or Trowel Application

A stucco topcoat coating is prepared having the following ingredients:

| Ingredient | Weight Percent |
|---|---|
| 1. Water | 17.0% |
| 2. Hydroxyethyl Cellulose | 0.5% |
| 3. Defoamer | 0.83% |
| 4. Dispersant | 1.34% |
| 5. Surfactant | 0.38% |
| 6. Titanium Dioxide | 3.30% |
| 7. Calcium Carbonate | 16.49% |
| 8. Wollastonite | 1.1% |
| 9. Attapulgite Clay | 0.44% |
| 10. Acrylic Latex Emulsion (50%) | 37.37% |
| 11. Dry Film Preservative | 0.61% |
| 12. Can Preservative | 0.17% |
| 13. Smooth Perlite | 4.4% |
| 14. Special Pumice | 14.3% |
| 15. Texanol Ester | 1.32% |
| 16. Heur Thickener | 0.44% |

Details for some of the ingredients or ingredient categories are as follows:
2. Natrosol, Bermocolle, or Methocel
3. Colloid 640, Colloid 643, Foamaster NXZ, or Foamaster VL
4./5. Tamol 681, Tamol 850, Tamol 731, Tamol 901, Byk 346, KTPP, Tamol 165, or Disperbyk 190
6. Tronox CR-828, Tronox CR-826, Tioxide TR-93, Tioxide TR-90, or Tioxide TR-60
7. Drikilite, Duramite, or Atomite
8. NYAD G
9. Attagel 50 or equivalent
10. Rhoplex EI-3500, Rhoplex EI-2000, Rhoplex AC-264, EPS 2705, or Neocryl XK-98
11. Polyphase 663, Rocima 200, Rocima 63, Polyphase AF-1, or Acticide GA
12. Kathon LX 1.5 or equivalent
13. Airless GREFCO, Harborlite Co.
14. Pumice #3 or #4 C.R. Minerals
15. Texanol, Filmer IBT, Butyl Cellosolve, Butyl Carbitol, or Dowanol PPh
16. Acrysol TT-615, Acrysol TT-963, Acrysol DR-6600, Acrysol SCT-275, or Acrysol 2020 NPR This stucco coating includes mixed metal oxide pigments which offer both superior fade resistance and reflectivity in the near infrared range. This coating uses a specific pumice aggregate to achieve both a semi-course texture that can either be spray or trowel applied.

When spray applied, the product is atomized using either a Graco 204-000 texture gun, hopper gun, or 2030 texture gun. Application of the finish works best through the 204-000 style gun which utilizes "buck Rogers" tips so that spray pattern can be carefully controlled. Fluid delivery to the gun can be achieved using any number of equipment types such as Graco President 10:1 pump, TexSpray 5900 HD, TexSpray Mark IV, TexSpray mark V, TexSpray 2030, Pressure Pot with hose assembly. Atomizing air to the gun and fluid delivery is adjusted so that a consistent spray pattern is achieved which will allow the product to build onto the surface to achieve 25-40 wet mils. This may be accomplished in either one or two spray passes.

EXAMPLE 9

Application of Marine Coatings to a Tug Boat

Marine coating systems that include heat reflective metal oxide pigments and a polyurethane top coat as describe herein to above-waterline exterior surfaces of a dark colored (black) tug boat, including ships decks, walls, railings, bulwarks, trim, seating areas, fixtures and the like. For the walls, railings, bulwarks and the like the coating system includes the following layers: (1) a metal primer spot applied to corroded areas, (2) a Tex-Bond acrylic/latex resin coating is applied to cover any previously coated substrate, (3) a black colored heat reflective metal oxide pigment containing layer that includes Kynar Aquatic® PVDF (e.g., a REFLECT-TEC™ layer) as described herein, (4) a two component polyurethane top coat. The decks are coated with a non-slip coating as described herein with the following layers: (1) a primer or bonding layer (for example an acrylic/latex resin such as "Tex-Bond") applied as needed, (2) a primary layer that includes heat reflective metal oxide pigments and pigments needed for the desired black color (for example a layer of REFLECT-TEC™), (3) aluminum oxide texturing material sprinkled on the primary layer, (4) layer that includes heat reflective metal oxide pigments and pigments needed for the desired black color (for example a layer of REFLECT-TEC™) coated over the primary layer and the texturing material, and (4) a two-component polyurethane topcoat layer. The interior areas of the boat are cooler on sunny days than a similar boat coated with traditional coatings that do not include heat reflective metal oxide pigments. The outside working area of the boat on sunny days are likewise cooler than a similar boat coated with traditional coatings that do not include heat reflective metal oxide pigments as there is less heat radiated from the walls and decks. Also, the railings, fixtures, benches and the like are cooler to the touch on sunny days then the extremely hot comparable surfaces of a similar boat coated with traditional coatings that do not include heat reflective metal oxide pigments. Finally, the black color of the boat does not fade over a period of a year as does a similar boat coated with traditional coatings that do not include heat reflective metal oxide pigments, thus in the during the needed annual repainting only the polyurethane top coat is repainted.

EXAMPLE 10

Dry Side Application of Heat Reflective Coatings to Roofing Tiles

A heat reflective coating, that can be used, for example, for application to as a topcoat clear tinting base for application to tile is prepared with the following ingredients:

| Ingredient | Weight Percent |
| --- | --- |
| 1. Water | 4.1% |
| 2. Bentone Clay | 0.3% |
| 3. Defoamer | 0.90% |
| 4. Dispersant | 0.45% |
| 5. Surfactant | 0.33% |
| 6. Acrylic Latex Emulsion (48%) | 70.77% |
| 7. PVDF Resin | 17.88% |
| 8. Can Preservative | 0.24% |
| 9. Dry Film Preservative | 0.81% |
| 10. Anti Block Additive (Carnauba dispersion) | 1.68% |
| 11. Butyl Cellosolve | 1.56% |
| 12. Heur Thickener | 0.98% |

To above Titanium Dioxide and IR Reflective pigment dispersion are added up to 15% by weight Details for some of the ingredients or ingredient categories are as follows:
2. Bentone DYCE
3. Colloid 640, Colloid 643, Foamaster NXZ, or Foamaster VL
4./5. Tamol 681, Tamol 850, Tamol 731, Tamol 901, Byk 346, KTPP, Tamol 165, or Disperbyk 190, Triton CF-10
6. Rhoplex CS-4000, Rhoplex EI-3500
7. Kynar Aquatec ARC
8. Kathon LX 1.5 or equivalent
9. Polyphase 663, Rocima 200, Rocima 63, Polyphase AF-1, or Acticide GA
10. Aquaslip 952
11. Acrysol TT-615, Acrysol TT-963, Acrysol DR-6600, Acrysol SCT-275, or Acrysol 2020 NPR Concrete or clay tiles are prepared, optionally in molds as appropriate and are present on a conveyer belt factory tile system. The tiles on the conveyer belt move through an infrared heating element at 90-120 degrees Fahrenheit and are exposed to the heat for a sufficient amount of time for the tiles to dry/harden/cure. The conveyer belt system is configured such that there is a coating sprayer that spray applies the above heat reflective coating immediately after the tiles exit the heating element, ie the spraying occurs within 5 seconds of the tiles exiting the heating element and while the tiles are still within 5 degrees of the curing/hardening/drying temperature. The coating is applied in an amount resulting in a 3-5 mils dry film thickness coating. The tiles may be exposed to a subsequent heating element to dry/cure the heat reflective coating. and before the tiles are dry (solidified) the above heat reflective metal oxide pigment coating is applied at, for example, 3-4 mils wet film thickness. The tiles with the coating are then placed in a heating oven (optionally a forced air oven, and optionally at a reduced humidity) and heated at time and temperature suitable to harden the tiles and heat reflective top coating. A second optional heat reflective top coat of the above coating may be applied, for example at 3-4 mils wet film thickness and the tiles may be heated again (with the two layers resulting in a top coat having a total thickness of about 3-5 mils dry film thickness). The tiles are then removed from the mold and palleted for additional yard cure for the appropriate amount of time.

EXAMPLE 11

Wet Side Application of Heat Reflective Coatings to Roofing Tiles

A heat reflective coating as in Example 10 is prepared. Concrete or clay tiles are prepared, optionally in molds as appropriate and are placed on a conveyer belt factory tile system. While the tiles are still wet (uncured or unhardened) the tiles pass under a coating sprayer that spray applies the heat reflective coating applied at an amount sufficient to result in a 3-5 mils dry film thickness coating. The tiles with the coating move through an infrared heating element at about 90-120 degrees Fahrenheit for an amount of time suitable to dry/harden/cure both the tiles and the coating. The tiles are then removed from the mold and palleted for additional yard cure for the appropriate amount of time.

EXAMPLE 12

Wet Side and Dry Side Application of Heat Reflective Coatings to Roofing Tiles

A heat reflective coating as in Example 10 is prepared. Concrete or clay tiles are prepared, optionally in molds as appropriate and are placed on a conveyer belt factory tile system. While the tiles are still wet (uncured or unhardened) the tiles pass under a coating sprayer that spray applies the heat reflective coating applied at, for example, 3-4 mils wet film thickness. The tiles with the coating move through an infrared heating element at about 90-120 degrees Fahrenheit for an amount of time suitable to dry/harden/cure both the tiles and the coating. As the tiles exit the heating element on the conveyer belt the tiles are sprayed a second time with the heat reflective coating as described in Example 10, with the two layers resulting in a top coat having a total thickness of about 3-5 mils dry film thickness. The tiles are then removed from the mold and palleted for additional yard cure for the appropriate amount of time.

The invention illustratively described herein may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other documents.

The inventions illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

In addition, where features or aspects of the invention are described in terms of Markush groups, those skilled in the art will recognize that the invention is also thereby described in terms of any individual member or subgroup of members of the Markush group.

Other embodiments are set forth within the following claims.

What is claimed is:

1. A method of applying a heat reflective coating to a concrete or clay tile, said method comprising spray applying a heat reflective coating to the surface of said concrete or clay tile; wherein said heat reflective coating comprises a heat reflective metal oxide pigment, an acrylic resin and a fluorinated resin system; and wherein the heat reflective metal oxide pigment comprises one or more pigments selected from the group consisting of a pigment having a corundum-hematite crystal lattice structure, a pigment having a spinel crystal lattice structure and a pigment having a nickel titanate rutile structure.

2. The method of claim 1, wherein said acrylic resin is a quick set resin.

3. The method of claim 1, wherein said coating further comprises a PVDF fluorinated resin system.

4. The method of claim 1, wherein said coating further comprises a FEVE fluorinated resin system.

5. The method of claim 1, wherein said coating is applied while the concrete or clay tile is wet (unhardened).

6. The method of claim 1, wherein said coating is applied while the concrete or clay tile is dry (hardened).

7. The method of claim 1, wherein said coating is applied while the concrete or clay tile is wet (unhardened) and wherein said concrete or clay tile is heated until said concrete or clay substrate and said coating dry (harden).

8. The method of claim 1, wherein said coating is applied while said concrete or clay tile is wet (unhardened) and said method further comprises heating concrete or clay tile until said concrete or clay substrate and said coating dry (harden) and applying a second coat of said heat reflective coating to said concrete or clay tile.

9. The method of claim 1 wherein said heat reflective coating is applied at 3-5 mils dry film thickness.

10. The method of claim 1, wherein the coating is applied in an automated factory system.

* * * * *